(12) United States Patent
Kim et al.

(10) Patent No.: US 10,687,188 B2
(45) Date of Patent: Jun. 16, 2020

(54) MOBILE APPLICATION ACCELERATOR

(71) Applicant: CLOUDFLARE, INC., San Francisco, CA (US)

(72) Inventors: Jeff Sesung Kim, Milpitas, CA (US); Junho Choi, Mountain View, CA (US); Sang Jo Lee, Sunnyvale, CA (US); Young Keun Park, San Jose, CA (US); Tianyu Shi, Sunnyvale, CA (US)

(73) Assignee: CLOUDFLARE, INC., San Francisco, CA (US)

(*) Notice: Subject to any disclaimer, the term of this patent is extended or adjusted under 35 U.S.C. 154(b) by 455 days.

(21) Appl. No.: 15/094,904

(22) Filed: Apr. 8, 2016

(65) Prior Publication Data

US 2017/0295451 A1    Oct. 12, 2017

(51) Int. Cl.
*H04M 3/42* (2006.01)
*H04W 4/60* (2018.01)
*H04W 8/18* (2009.01)

(52) U.S. Cl.
CPC .............. *H04W 4/60* (2018.02); *H04W 8/18* (2013.01)

(58) Field of Classification Search
CPC ........... H04L 29/08108; H04W 12/12; H04W 12/06; H04W 72/04; H04W 16/12; H04W 24/00; H04W 28/08; H04W 4/14
USPC ...... 455/410–411, 414.1, 450, 451, 453, 466
See application file for complete search history.

(56) References Cited

U.S. PATENT DOCUMENTS

| | | | |
|---|---|---|---|
| 6,389,552 B1* | 5/2002 | Hamilton | G06F 11/1464 379/84 |
| 7,111,086 B1 | 9/2006 | Ecoleston et al. | |
| 8,745,177 B1* | 6/2014 | Kazerani | H04L 43/08 370/389 |
| 8,819,187 B1* | 8/2014 | Hofmann | H04L 67/2814 709/219 |
| 9,310,982 B1* | 4/2016 | McClintock | G06Q 50/00 |
| 9,380,523 B1* | 6/2016 | Mijar | H04W 48/18 |
| 2001/0055285 A1 | 12/2001 | Tomoike | |
| 2003/0182431 A1 | 9/2003 | Sturniolo et al. | |
| 2004/0122907 A1 | 6/2004 | Chou et al. | |

(Continued)

OTHER PUBLICATIONS

PCT International Search Report and Written Opinion, PCT Application No. PCT/US2017/026211, dated Jun. 19, 2017, 20 pages.

*Primary Examiner* — Matthew W Genack
(74) *Attorney, Agent, or Firm* — Nicholson De Vos Webster & Elliott LLP

(57) ABSTRACT

Techniques for providing mobile device content delivery acceleration for mobile applications are discussed herein. Some embodiments may provide for a mobile accelerator system including a plurality of point-of-presences (POPs) and a control tower system. The control tower system may be configured to control mobile data transfer acceleration between a mobile device and the content server via the plurality of POPs of the mobile accelerator system. Each mobile application executing on the mobile device may be registered, validated, and then associated with a device POP that forms a dedicated connection with an entry POP of the plurality of POPs. Mobile data transfer acceleration for each mobile application may be selectively activated or deactivated, such as based on user configurations at the application level, domain name level, and/or country level.

26 Claims, 11 Drawing Sheets

(56) References Cited

U.S. PATENT DOCUMENTS

| | | | |
|---|---|---|---|
| 2006/0229090 A1* | 10/2006 | LaDue | H04W 84/04 455/507 |
| 2009/0097490 A1 | 4/2009 | Sanderson et al. | |
| 2009/0228603 A1 | 9/2009 | Ritzau et al. | |
| 2011/0088028 A1* | 4/2011 | Tofighbakhsh | H04L 41/0806 717/178 |
| 2011/0307538 A1 | 12/2011 | Rimac et al. | |
| 2012/0110174 A1 | 5/2012 | Wootton et al. | |
| 2014/0149578 A1* | 5/2014 | Goldman | H04L 45/02 709/224 |
| 2015/0012636 A1* | 1/2015 | Wang | H04L 41/0803 709/223 |
| 2015/0180995 A1 | 6/2015 | Hofmann | |
| 2015/0281331 A1* | 10/2015 | Steiner | H04L 69/14 709/203 |
| 2016/0021078 A1 | 1/2016 | Shah | |
| 2017/0251050 A1* | 8/2017 | Masson | H04L 67/10 |

* cited by examiner

MOBILE APPLICATION ACCELERATOR

FIELD

Embodiments of the invention relate, generally, to networked content delivery for mobile devices.

BACKGROUND

Technologies such as Wi-Fi or mobile broadband (e.g., 2G/3G/long-term evolution (LTE), etc.) allow mobile devices, such as cellphones or smartphones, to connect with remote content servers via the Internet. The speed of content delivery can affect the quality of data access and mobile device performance. For example, fast internet browsing, high quality video or audio data streaming, or multiplayer gaming may require data transfer rates that are faster than the capacities of conventional mobile data networks. Virtually any mobile device application supported by Internet connectivity is enhanced with faster data transfer rates. In this regard, improvements to networked content delivery for mobile devices are desirable.

BRIEF SUMMARY

Through applied effort, ingenuity, and innovation, solutions to improve such mobile devices have been realized and are described herein. Some embodiments may provide for a system including a mobile device and a mobile accelerator system. The mobile accelerator system may include a control tower system and multiple, interconnected point of presences (POPs). The control tower system may include an accelerator portal server configured to: associate a client key with a mobile application authorized for mobile data transfer acceleration via the plurality of POPs; provide the client key to a mobile device configured to execute the mobile application; subsequent to providing the client key to the mobile device, receive a request to initialize the mobile data transfer acceleration for the mobile application from the mobile device, wherein the request includes the client key; in response to receiving the request to initialize mobile data acceleration for the mobile application, validate the client key; in response to validating the client key: determine an entry POP from the plurality of POPs; generate an initialization response including the entry POP; and provide the initialization response to the mobile device to facilitate creation of a dedicated connection between the mobile device and the entry POP for the mobile data transfer acceleration.

In some embodiments, the control tower system may further include a global server load balancing (GSLB) server configured to determine an entry POP list based on a ranking of the plurality of POPs for connection speed with the mobile device. The initialization response may include the entry POP list.

In some embodiments, the GSLB server configured to determine the ranking of the plurality of POPs may include the GSLB server being configured to determine the ranking based on one or more of: POP server load balance; POP server health check; mobile device geo-location; or mobile provider information or location;

In some embodiments, the control tower system may further include an analytic server configured to: receive traffic data from the mobile device captured based on monitoring data transfers via the dedicated connection between the mobile device and the entry POP for the mobile application; and generate traffic metric data based on the traffic data.

In some embodiments, the accelerator portal server may be further configured to, in response to validating the client key, determine user configuration data for the mobile application provided by the merchant device. The initialization response may include the user configuration data. The initialization response may be provided to the mobile device to facilitate creation of the dedicated connection when authorized by the user configuration data.

In some embodiments, the user configuration data may define an application level configuration for the mobile application that enables or disables the mobile data transfer acceleration for one or more mobile applications executing on the mobile device on a per-app basis.

In some embodiments, the user configuration data may define a domain name level configuration for the mobile application that enables or disables the mobile data transfer acceleration based on content server address.

In some embodiments, user configuration data may define a country level configuration for the mobile application that enables or disables the mobile data transfer acceleration based on a current location of the mobile device.

In some embodiments, the accelerator portal server is further configured to, in response to validating the client key, determine management configuration data for the mobile application. The initialization response may include the management configuration data. The management configuration data may define a partial deployment configuration for the mobile application that enables or disables use of the mobile data transfer acceleration based on group membership of the mobile device.

In some embodiments, when authorized by the user configuration data, the entry POP may be further configured to: form the dedicated connection with a device POP of the mobile device; determine a dynamic path traversing one or more of the plurality of POPs; and route data transfers between the mobile device and a content server through the dedicated connection and the dynamic path. The device POP may be a network proxy server created by the mobile device for the mobile application when authorized by the user configuration data.

In some embodiments, a network proxy server address of the mobile application may point to the device POP. The entry POP may be further configured to receive the data transfers from the mobile application via the device POP.

In some embodiments, the dedicated channel and the dynamic path may be configured to utilize a mobile accelerator protocol that facilitates the mobile data transfer acceleration. The plurality of POPs may further include an exit POP. The dynamic path may include the exit POP. The exit POP may include a protocol translation module configured to convert the data transfers using the mobile accelerator protocol to a default protocol of the mobile application.

In some embodiments, the dedicated channel may be configured to utilize a mobile accelerator protocol that facilitates the mobile data transfer acceleration. The dynamic path may be configured to utilize a default protocol of the mobile application. The entry POP may include a protocol translation module configured to convert the data transfers using the mobile accelerator protocol to the default protocol of the mobile application.

In some embodiments, the entry POP may be configured to form multiple dedicated connections with multiple devices POPs of the mobile device, each device POP associated with a different mobile application executing on the mobile device.

Some embodiments may include a method for mobile data transfer acceleration of a mobile application, comprising: associating, by one or more servers of a mobile accelerator system, a client key with a mobile application authorized for mobile data transfer acceleration via a plurality of POPs of the mobile accelerator system; providing, by the one or more servers, the client key to a mobile device configured to execute the mobile application; subsequent to providing the client key to the mobile device, and by the one or more servers, receiving a request to initialize the mobile data transfer acceleration for the mobile application from the mobile device, wherein the request includes the client key; in response to receiving the request to initialize mobile data acceleration for the mobile application, and by the one or more servers, validating the client key; in response to validating the client key, and by the one or more servers: determining an entry POP from the plurality of POPs; generating an initialization response including the entry POP; and providing the initialization response to the mobile device to facilitate creation of a dedicated connection between the mobile device and the entry POP for the mobile data transfer acceleration.

In some embodiments, the method may further include determining, by the one or more servers, an entry POP list based on a ranking of the plurality of POPs for connection speed with the mobile device, and wherein the initialization response includes the entry POP list.

In some embodiments, determining the ranking of the plurality of POPs may include determining the ranking based on one or more of: POP server load balance; POP server health check; mobile device geo-location; or mobile provider information or location.

In some embodiments, the method may further include, by the one or more servers: receiving traffic data from the mobile device captured based on monitoring data transfers via the dedicated connection between the mobile device and the entry POP for the mobile application; and generating traffic metric data based on the traffic data.

In some embodiments, the method may further include, in response to validating the client key, determining user configuration data for the mobile application provided by the merchant device. The initialization response may include the user configuration data. The initialization response may be provided to the mobile device to facilitate creation of the dedicated connection when authorized by the user configuration data.

In some embodiments, the user configuration data may define an application level configuration for the mobile application that enables or disables the mobile data transfer acceleration for one or more mobile applications executing on the mobile device on a per-app basis In some embodiments, the user configuration data may define a domain name level configuration for the mobile application that enables or disables the mobile data transfer acceleration based on content server address.

In some embodiments, the user configuration data may define a country level configuration for the mobile application that enables or disables the mobile data transfer acceleration based on a current location of the mobile device.

In some embodiments, the method may further include, in response to validating the client key, determining management configuration data for the mobile application. The initialization response may include the management configuration data. The management configuration data defines a partial deployment configuration for the mobile application that enables or disables use of the mobile data transfer acceleration based on group membership of the mobile device.

In some embodiments, the method may further include, when authorized by the user configuration data, and by the entry POP: forming the dedicated connection with a device POP of the mobile device; determining a dynamic path traversing one or more of the plurality of POPs; and routing data transfers between mobile device and a content server through the dedicated connection and the dynamic path. The device POP may be a network proxy server created by the mobile device for the mobile application when authorized by the user configuration data.

In some embodiments, a network proxy server address of the mobile application may point to the device POP. The method may further include receiving, by the entry POP, the data transfers from the mobile application via the device POP.

In some embodiments, the dedicated channel and the dynamic path may be configured to utilize a mobile accelerator protocol that facilitates the mobile data transfer acceleration. The plurality of POPs may further include an exit POP. The dynamic path may include the exit POP. The method may further include converting, by the exit POP, the data transfers using the mobile accelerator protocol to a default protocol of the mobile application.

In some embodiments, the dedicated channel may be configured to utilize a mobile accelerator protocol that facilitates the mobile data transfer acceleration. The dynamic path may be configured to utilize a default protocol of the mobile application. The method may further include converting, by the entry POP, the data transfers using the mobile accelerator protocol to the default protocol of the mobile application.

In some embodiments, the method may further include, by the entry POP, forming multiple dedicated connections with multiple devices POPs of the mobile device, each device POP associated with a different mobile application executing on the mobile device.

These characteristics as well as additional features, functions, and details of various embodiments are described below. Similarly, corresponding and additional embodiments are also described below.

BRIEF DESCRIPTION OF THE DRAWINGS

Figure 1:
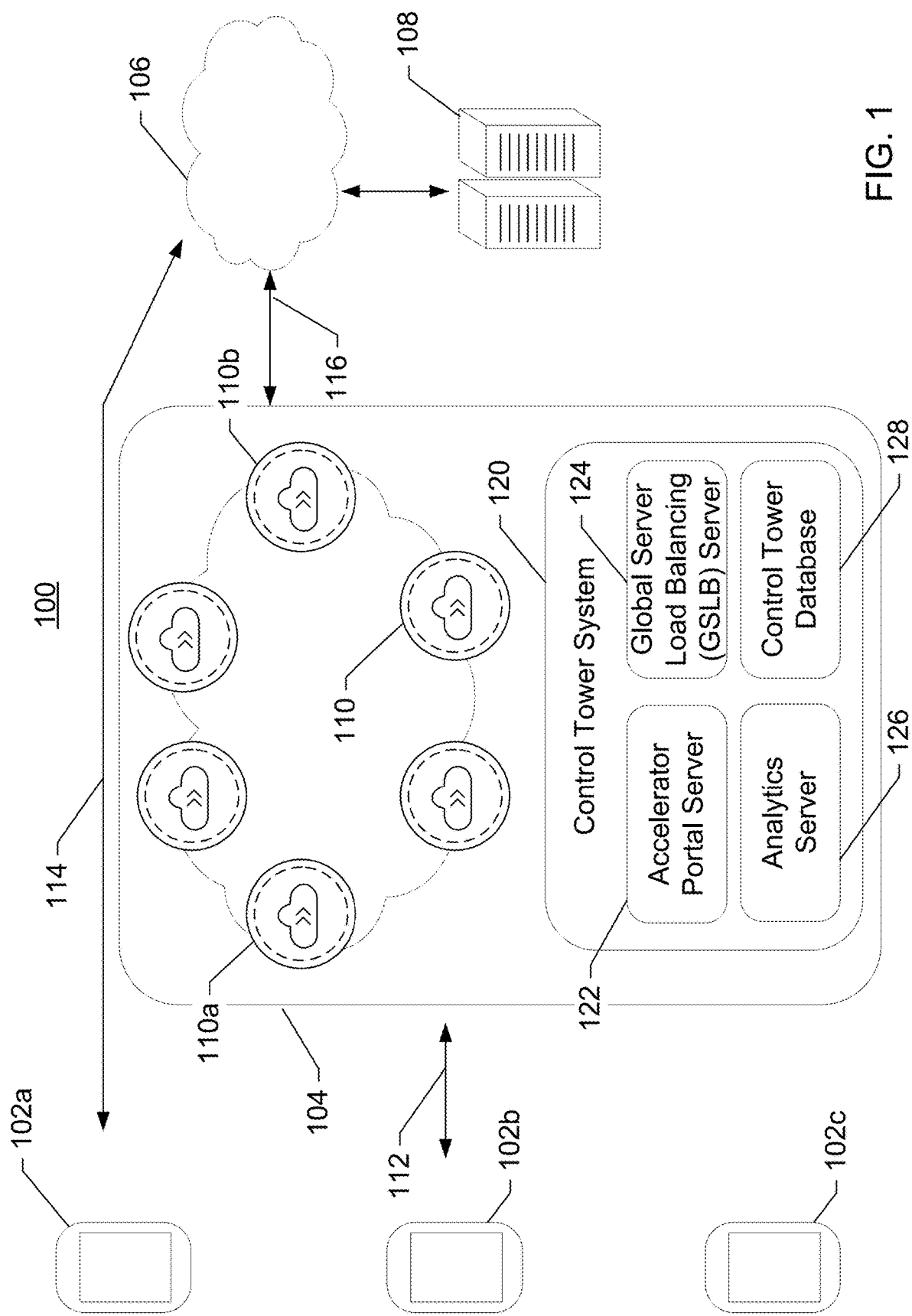
Figure 2:
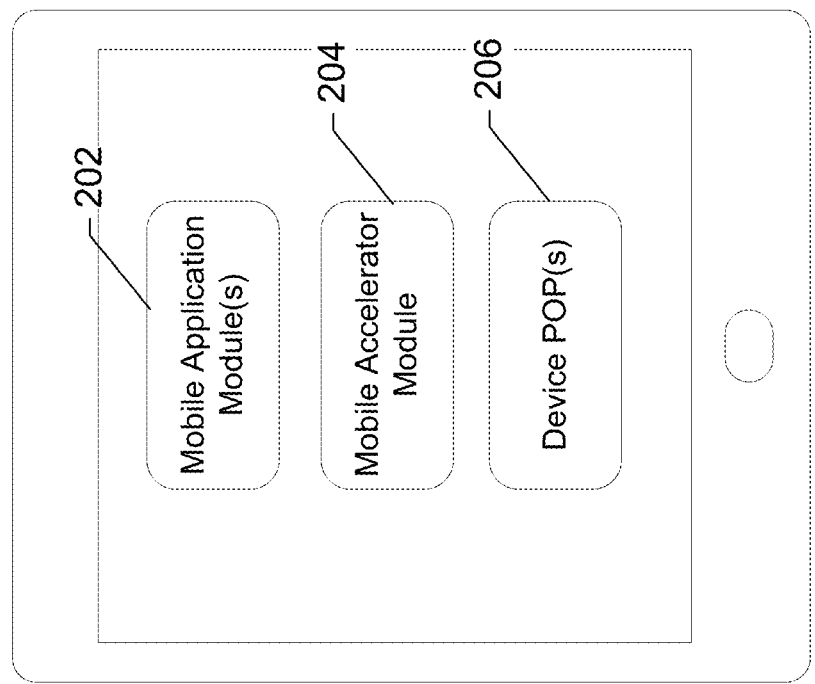
Figure 3:
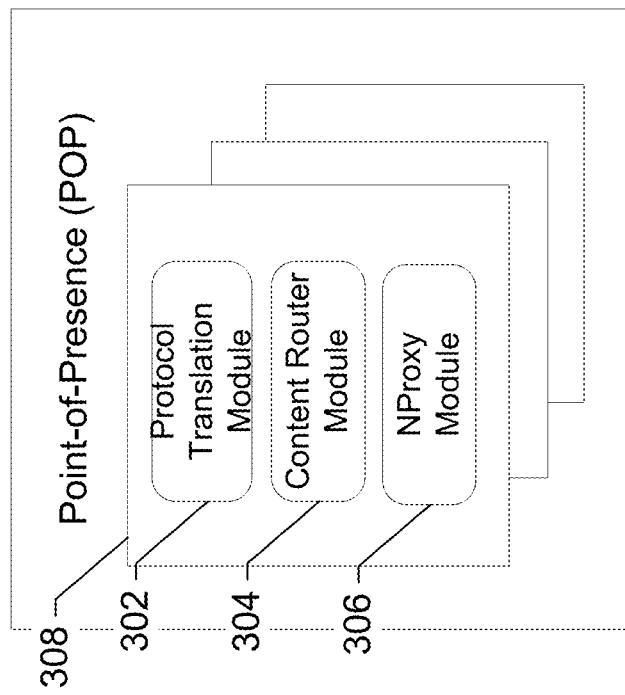
Figure 4:
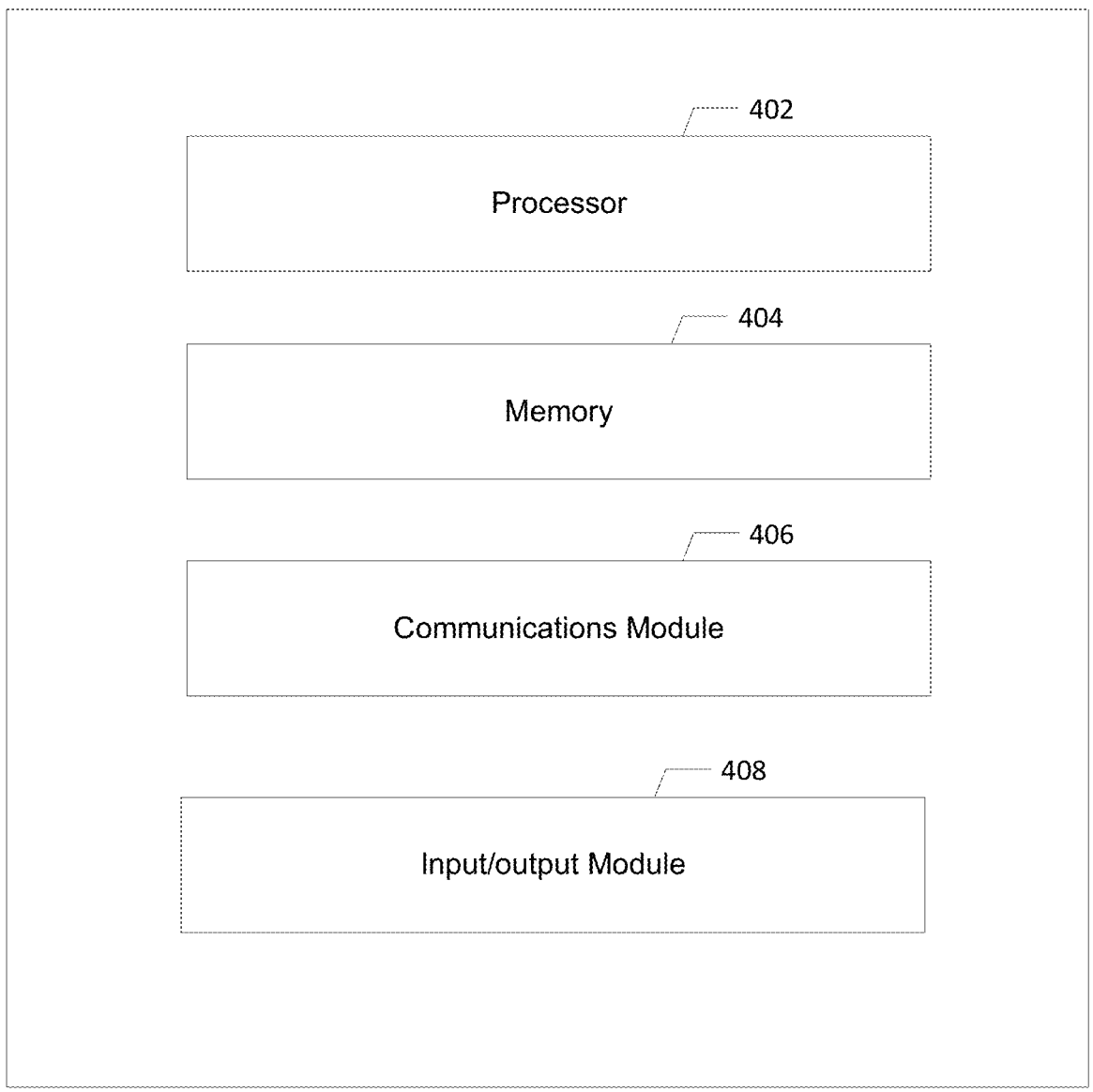
Figure 5:
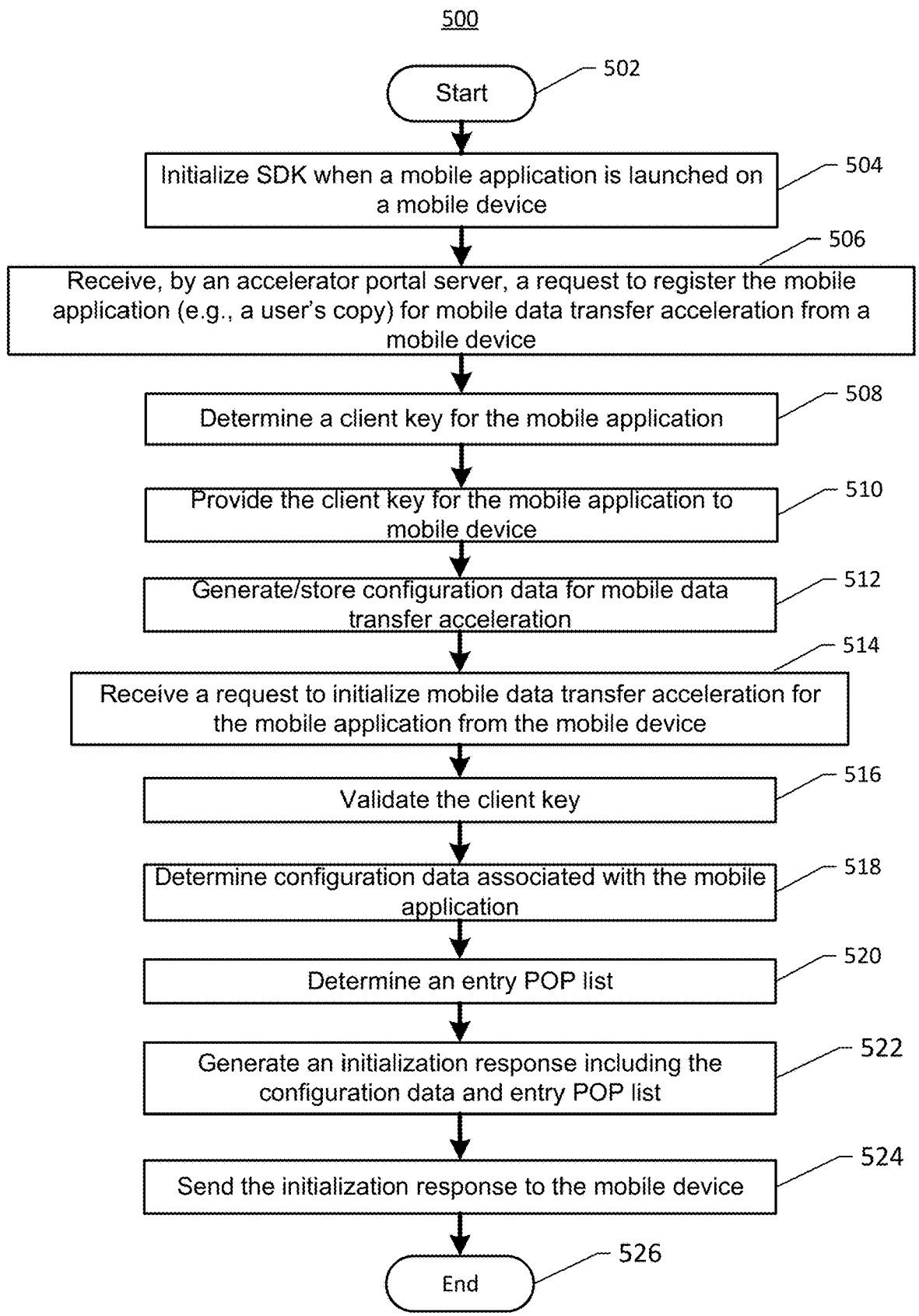
Figure 6:
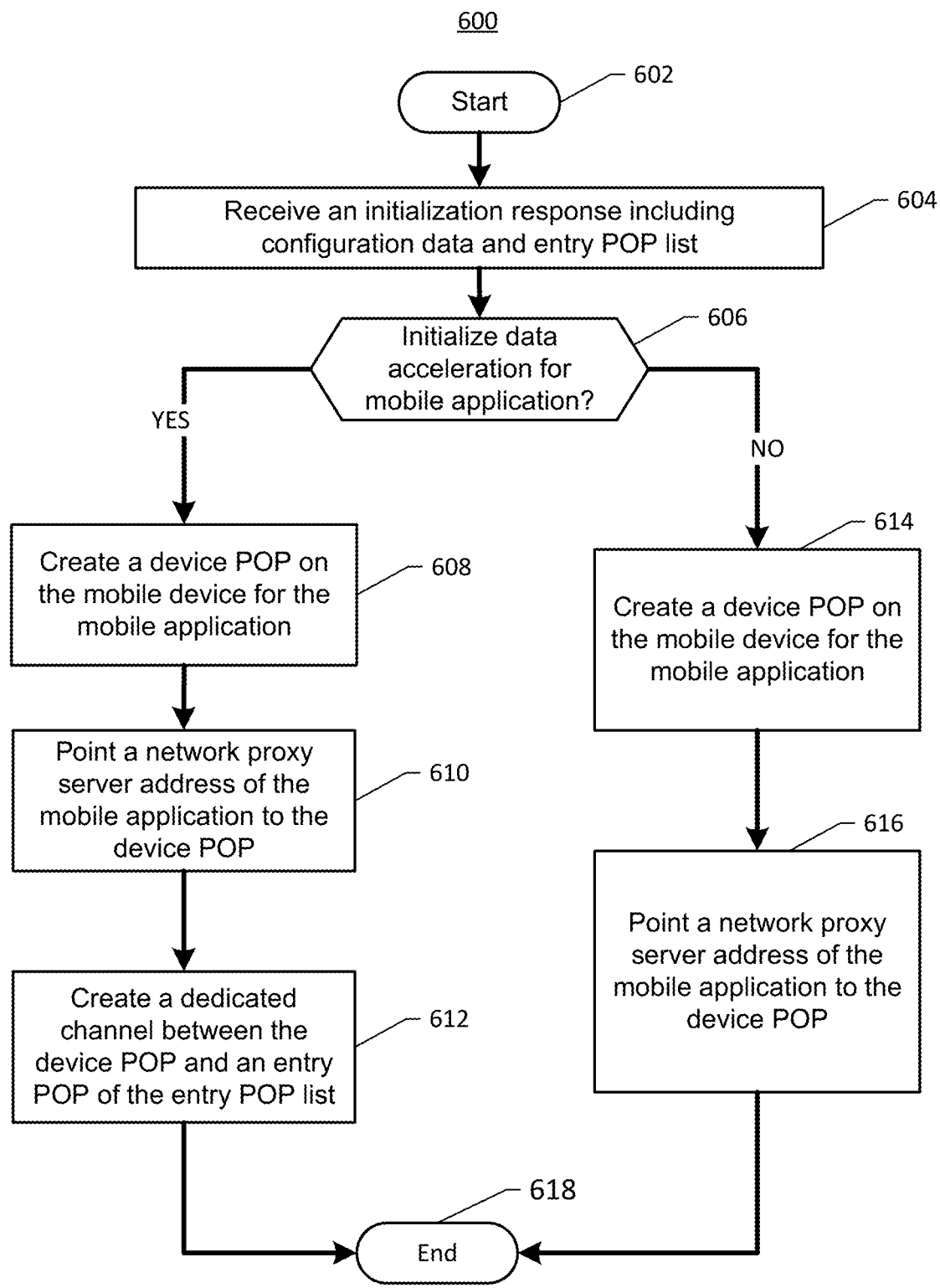
Figure 7:
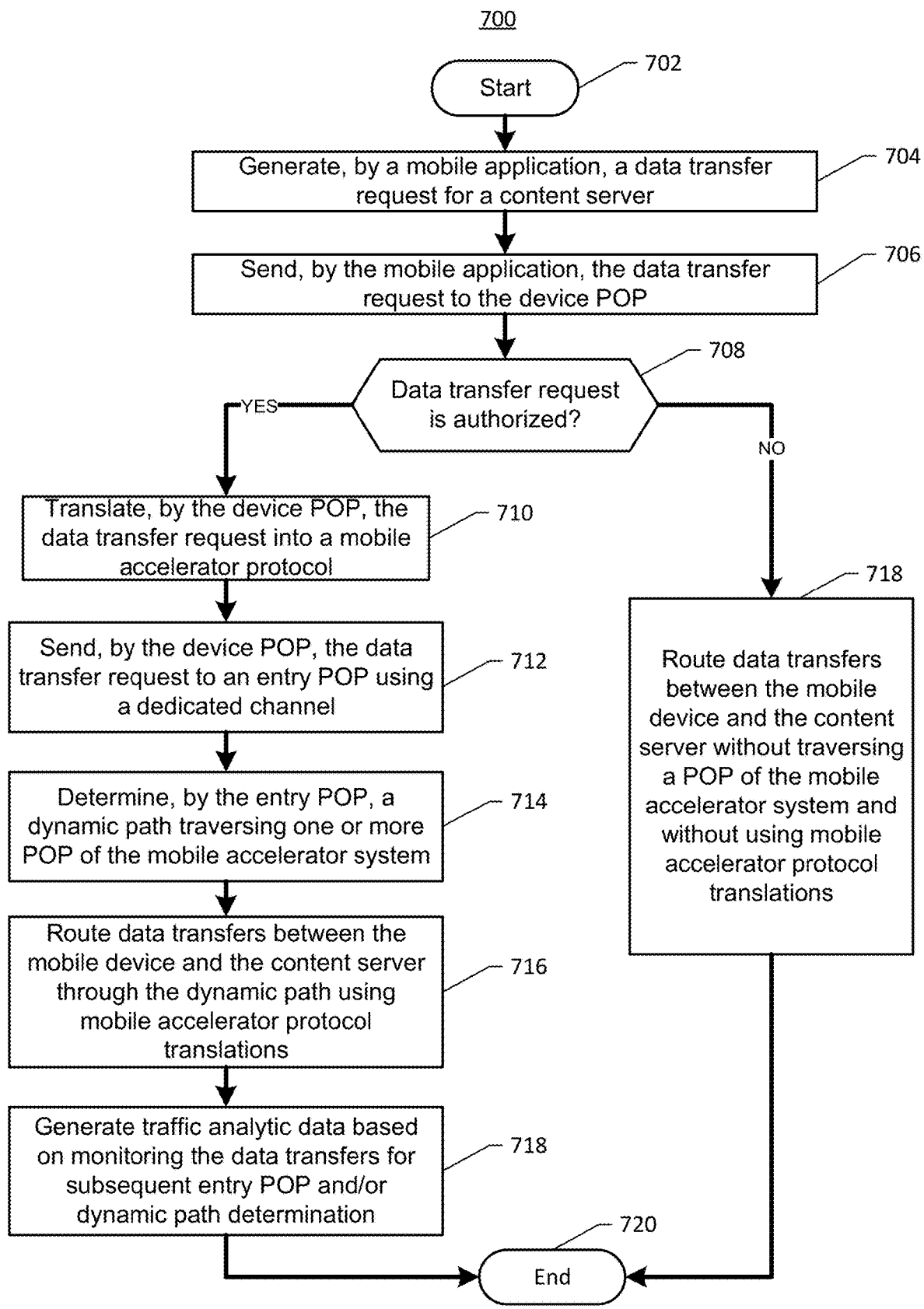
Figure 8:
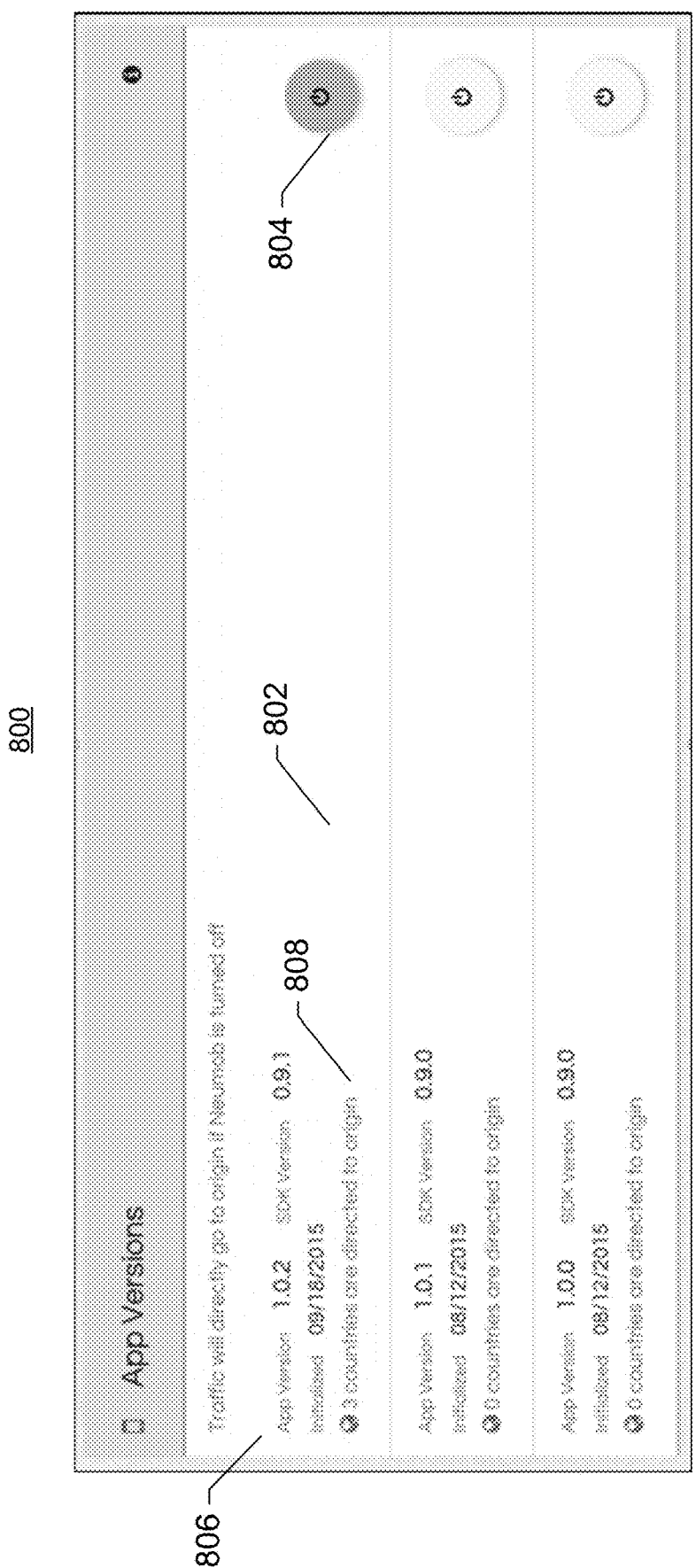
Figure 9:
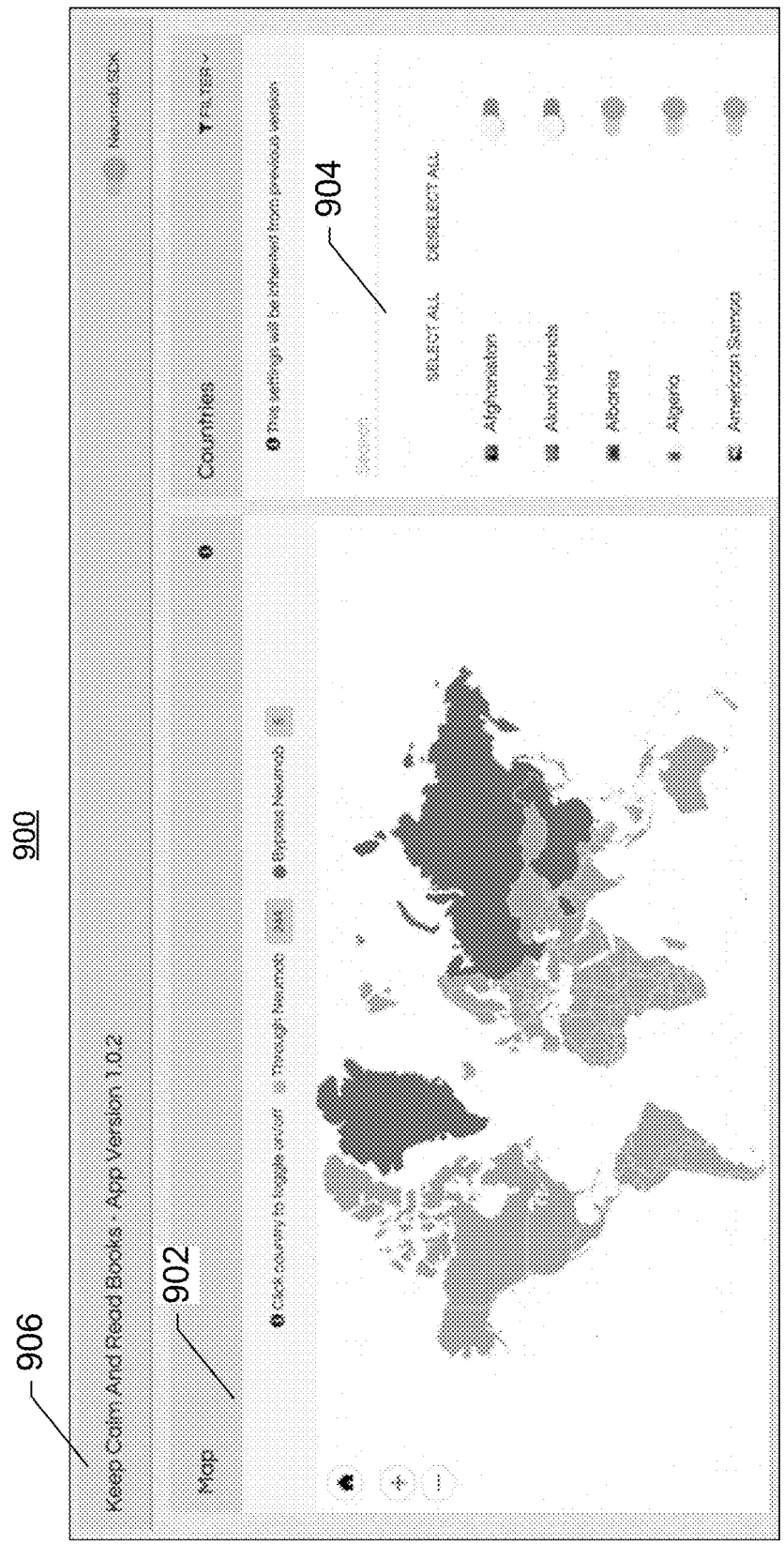
Figure 10:
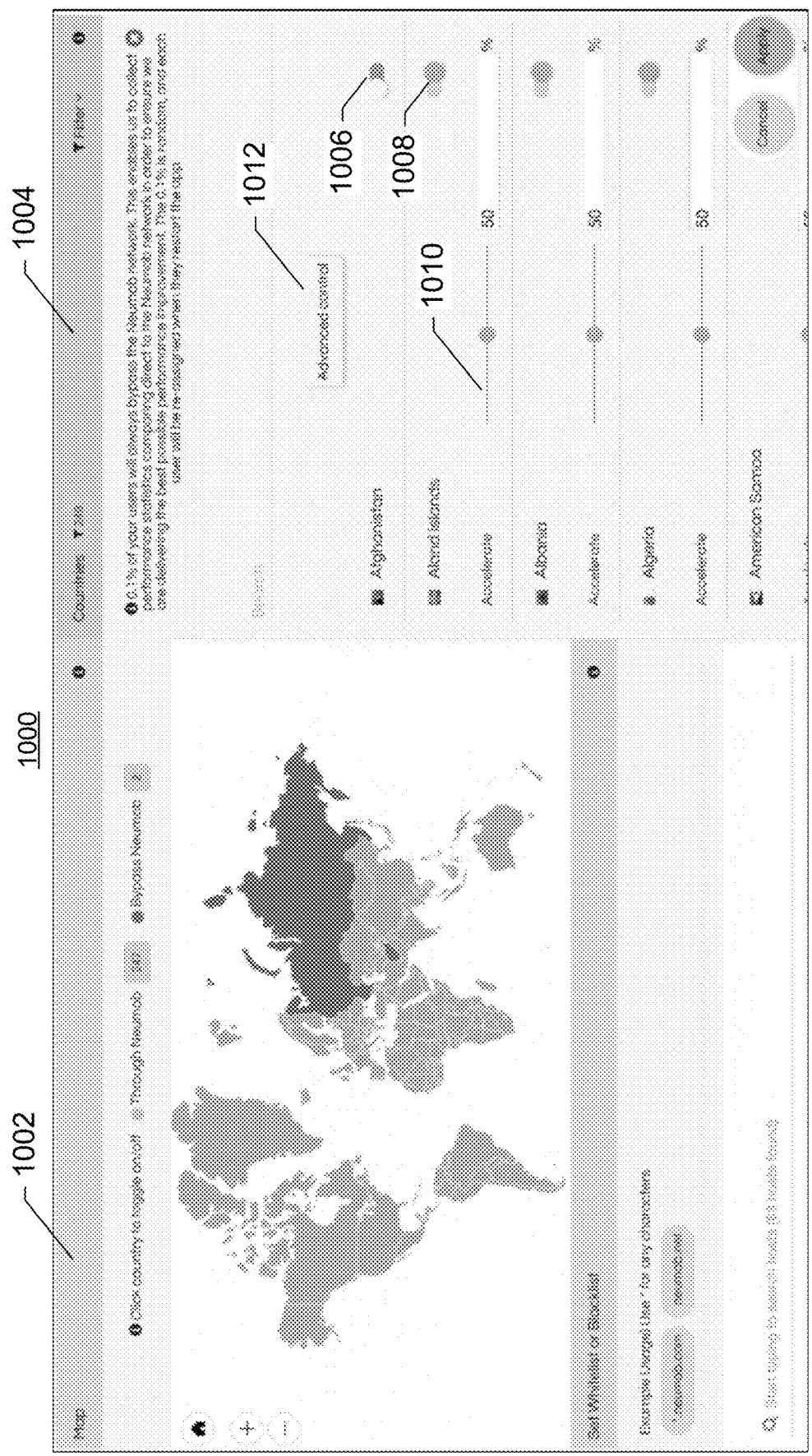
Figure 11:
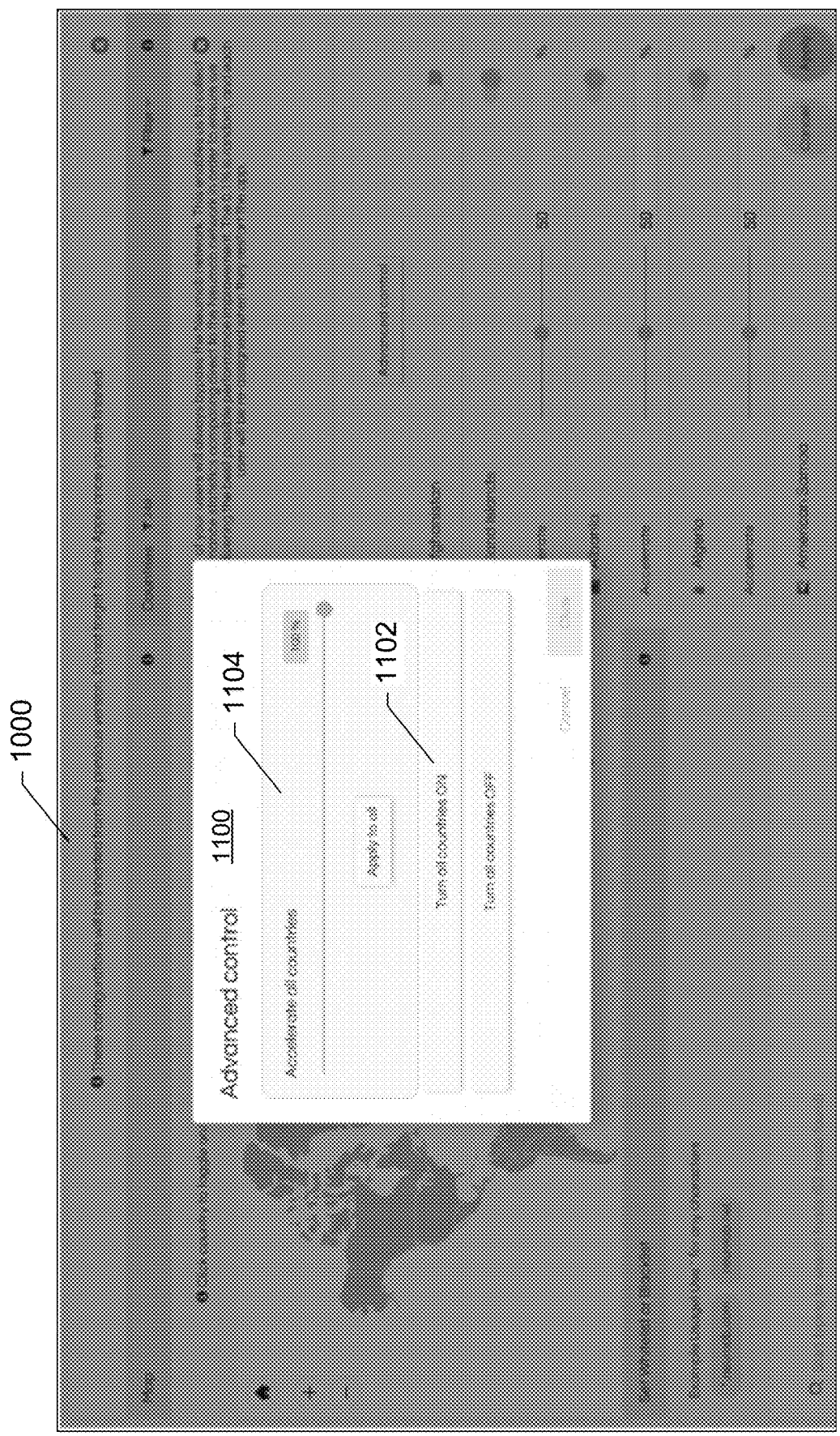

Having thus described some embodiments in general terms, reference will now be made to the accompanying drawings, which are not necessarily drawn to scale, and wherein:

FIG. 1 shows an example of a system, in accordance with some embodiments;

FIG. 2 shows a schematic block diagram of an example of a mobile device, in accordance with some embodiments;

FIG. 3 shows a schematic block diagram of an example of a point-of-presence (POPs) of a mobile accelerator system, in accordance with some embodiments;

FIG. 4 shows a schematic block diagram of an example of a device, in accordance with some embodiments;

FIG. 5 shows a flow chart of an example of a method for initializing mobile application data transfer acceleration on a mobile device, performed in accordance with some embodiments;

FIG. 6 shows a flow chart of an example of a method for creating a dedicated channel for mobile application data transfer acceleration, performed in accordance with some embodiments;

FIG. 7 shows a flow chart of an example of a method for mobile application data transfer acceleration, performed in accordance with some embodiments;

FIG. 8 shows an example of an application level configuration interface, in accordance with some embodiments;

FIG. 9 shows an example of a country level configuration interface, in accordance with some embodiments;

FIG. 10 shows an example of a country level configuration interface with deployment control, in accordance with some embodiments; and FIG. 11 shows an example of an application level deployment control interface, in accordance with some embodiments.

DETAILED DESCRIPTION

Embodiments will be described more fully hereinafter with reference to the accompanying drawings, in which some, but not all embodiments contemplated herein are shown. Indeed, various embodiments may be implemented in many different forms and should not be construed as limited to the embodiments set forth herein; rather, these embodiments are provided so that this disclosure will satisfy applicable legal requirements. Like numbers refer to like elements throughout.

Some embodiments discussed herein may provide for mobile device content delivery acceleration. For example, a mobile accelerator module may execute on the mobile device that monitors outgoing queries to content servers performed by the mobile device. The queries may be generated, for example, by virtually any application executing on the mobile device including an Internet browser application or other mobile applications (e.g., games, streaming audio or video, email, etc.) that access data from remote content servers via the Internet. In that sense, the techniques discussed herein can provide content delivery acceleration to various third party applications.

In some embodiments, the mobile device content delivery acceleration may be provided by a mobile accelerator system including a multiple point-of-presences (POPs) for accessing content from a content server. The POPs may be located at different geographical locations to provide a collection of access points to the Internet from the different geographical locations. A mobile device may form a dedicated transport channel with a fastest (e.g., based on synthetic latency) POP of the mobile accelerator system, or entry POP. The entry POP may then be configured to route data transfers between the mobile device and the content server through one or more POPs of the mobile accelerator system. Based on a dynamic path determination that optimizes connection quality measures such as synthetic latency, the data transfers may be routed from the mobile device, through the mobile accelerator system (e.g., to an entry POP via the dedicated transport channel, and then to a fastest exit POP), and then to the content server.

In some embodiments, the mobile accelerator system may be configured to provide selective data transfer acceleration on a per-application (and/or other dynamically specified) basis for mobile devices. The mobile accelerator system may include one or more control tower systems. The control tower system may be configured to facilitate mobile device application configuration to use the mobile accelerator system for data transfers between the mobile device and one or more content servers (e.g., that communicate with an application). The control tower system may include one or more servers and one or more databases, and may be part of a POP of the mobile accelerator system, or separate from the POPs that handle data transfer. The control tower system (or control tower POP) may include one or more accelerator portal servers, global server load balancing (GSLB) servers, analytics servers, and control tower databases.

The accelerator portal server may be configured to provide mobile application registration, and central management. For example, the accelerator portal server may provide a website where a mobile application developer can sign up, sign in and download a software development kit (SDK) that allows for integration of a mobile application with the mobile accelerator system. The accelerator portal server may be further configured to provide end user control and configuration of the mobile accelerator system functionality on the mobile device.

The GSLB server may be configured to provide entry POP routing for mobile device applications. For example, the GSLB server may use various techniques such as server load balancing, health checking, geo-location detection, consideration of mobile provider information and location (e.g. AT&T, San Francisco) to determine the optimal entry POP. In some embodiments, the GSLB server may be implemented as a representational state transfer (REST) web application programming interface (API) server.

The analytics server may be configured to collect various metric information for connections using the mobile accelerator system, run a big data processing engine to analyze traffic metric data, and store the traffic metric data into the one or more control tower databases for later lookup and mobile accelerator application interactions (e.g., traffic view, per-country traffic information, performance comparison charts, etc.). In some embodiments, the mobile accelerator system may include a collection of analytic servers configured to perform extract, transform and load (ETL) (e.g., streaming data handling, processing engine).

In some embodiments, a mobile device may include one or more mobile application modules, a mobile accelerator module, and one or more device POP(s). A mobile application module may be configured to execute an application on the mobile device that has been updated to use the mobile accelerator system for data transfers between one or more content servers (e.g., based on using the SDK). For each application to receive data transfer acceleration, the mobile accelerator module may be configured to generate a corresponding device POP, such as upon initialization of the mobile application. Each device POP may take the form of a network proxy executing on the mobile device. The device POP associated with a mobile application may create a dedicated channel to an optimized entry POP (e.g., as determined by the GSLB server), and data transfers speeds for the mobile application between the mobile device and the one or more content servers are improved based on optimized routing through the POPs of the mobile accelerator system, as well as protocol optimizations.

In some embodiments, the mobile accelerator module may be further configured to provide user configuration data of mobile acceleration, such as via an accelerator portal server that provides a user interface. For example, the accelerator portal server may provide for dynamic data acceleration on/off switching (e.g., based on application level configuration, country level configuration, or domain name level configuration), mobile accelerator application management, registration, security, etc.

Exemplary Architecture

FIG. 1 shows an example system 100 in accordance with some embodiments. System 100 may include one or more mobile devices 102 (e.g., mobile devices 102a-102c), mobile accelerator system 104, network 106, and content server 108. The mobile accelerator system 104 may include a plurality of point-of-presences (POPs) 110 and a control tower system 120. As discussed in greater detail below, a mobile device 102 may be connected with content server 108 via one or more of POPs 110 of the mobile accelerator system 104 to provide content delivery acceleration between content server 108 and the mobile device 102.

The mobile devices 102a-102b may each be associated with a user. Although three mobile devices are shown in FIG. 1, system 100 may include any number of mobile devices that may be associated with various other users. Mobile device 102 may include cellular telephone (including smartphones and/or other types of mobile telephones), tablet, laptop, electronic reader, e-book device, media device, wearable device (e.g., smart watch, smart glasses, etc.) and/or the like. In some embodiments, some or all of the techniques discussed herein with respect to a mobile device 102 and mobile acceleration may be applicable to a stationary device, such as a desktop computer, terminal, work station, server, among other things.

FIG. 2 shows a schematic block diagram of an example of a mobile device 102, in accordance with some embodiments. The mobile device 102 may include one or more mobile application modules 202, a mobile accelerator module 204, and one or more device POPs 206. The mobile application module 202 may be configured to execute an application on the mobile device that has been updated to use the mobile accelerator system 104 for data transfers between one or more content servers 108.

For each application to receive data transfer acceleration, the mobile accelerator module 202 may be configured to generate a corresponding device POP 206, such as upon initialization of the mobile application. The accelerator module 202 may be configured to (e.g., selectively) point the network proxy of the mobile application to the device POP 206. Alternatively, when the mobile accelerator system 104 is not used, the mobile accelerator module 202 may be configured to point the network proxy of the mobile application to a default network proxy. Each device POP 206 may take the form of a network proxy executing on the mobile device 102. The device POP 206 associated with a mobile application may create a dedicated channel to an optimized entry POP 110a. As such, data transfers speeds for the mobile application between the mobile device 102 and the one or more content servers 108 may be improved based on optimized routing through the POPs 110 of the mobile accelerator system 104.

In some embodiments, the accelerator portal server 122 may be further configured to provide user configuration of mobile acceleration, such as via an accelerator portal server that provides a user interface. For example, the accelerator portal server may provide for dynamic data acceleration on/off switching based on application level configuration, country level configuration, domain name level configuration, as well as other functionality such as registration, security, etc.

The mobile accelerator system 104 may include a plurality of point of presences, or POPs 110. A "POP," as used herein, refers to one or more servers, routers, Asynchronous Transfer Mode (ATM) switches, digital/analog call aggregators, etc. that provide an access point to network 106 (e.g., the Internet) for another device, such as the mobile device 102. The POPS 110 may be connected to each other by dedicated connections (e.g., fiber optic lines, Network Access Points (NAPS), etc.) and employ protocols that increase the speed of data transfer over conventional Internet traffic. Although shown as being separate from network 106, in some embodiments, the mobile accelerator system 104 may be at least in part supported by an Internet backbone of the network 106.

Each of the POPs 110 may be connected with each other and located at different geographical locations to provide a collection of access points to network 106 from the different geographical locations. For example, in a six POP mobile accelerator system 104, interconnected POPs 110 may be located in Singapore, Seoul, San Francisco, Tokyo, Dallas, and New York to form the mobile accelerator system 104.

FIG. 3 shows a schematic block diagram of an example of a POP 110 of a mobile accelerator system 104, in accordance with some embodiments. The POP 110 may include one or more proxy servers 308. Each proxy server may include a protocol translation module 302, a content router module 304, and an NProxy module 306. The protocol translation module 302 may be configured to provide a translation layer between a mobile accelerator protocol and conventional Internet protocols, such as the Transmission Control Protocol (TCP). The mobile accelerator protocol may include various techniques that improve the rate of data transfer as discussed in greater detail herein.

The content router module 304 may be configured to determine a dynamic path for data transfers between a device POP of a mobile device 102 and a content server 108, and facilitate data transfer routing accordingly. For example, the content router module 304 of an entry POP 110a may be configured to determine whether to route data transfers between the mobile device 104 and the content server 108 through the mobile accelerator system 104 (e.g., through an exit POP 110b), or directly through the network 104 (e.g., using the entry POP 110a as the exit POP). When used, the exit POP 110b may be selected from the POPs 110 based on providing the fastest direct connection access point to the content server 108.

The NProxy module 306 may be configured to receive incoming traffic of the POP 110 and route the traffic either through the mobile accelerator system 104 or not based on whether the traffic uses a protocol that can be optimized, such as HTTP or HTTPs. In some embodiments, some or all of the functionality of the NProxy module 306 may be performed by the mobile accelerator module 204 of the mobile device 106. Additional details regarding traffic protocol-based filtering and routing, applicable in some embodiments, are discussed in U.S. patent application Ser. No. 14/863,339, titled "Software Defined Dynamic Filtering," filed Sep. 23, 2015, which is incorporated by reference herein in its entirety.

Returning to FIG. 1, the control tower system 120 of the mobile accelerator system 104 may be configured to facilitate mobile device application configuration to use the mobile accelerator system 104 for data transfers between the mobile device 102 and one or more content servers 108. The control tower system 120 may include one or more accelerator portal servers 122, global server load balancing (GSLB) servers 124, analytics servers 126, and control tower databases 128.

The accelerator portal server 122 may be configured to provide mobile application registration, central management, among other things. For example, the accelerator portal server 122 may provide a website where a mobile application developer can sign up, sign in and download a software development kit (SDK) that allows for integration of a mobile application with the mobile accelerator system 104. The accelerator portal server 122 may be further configured to provide end user control and configuration of the mobile accelerator system functionality on the mobile device 102, such as based on communicating with the mobile accelerator module 204 of the mobile device 102.

The GSLB server 124 may be configured to provide entry POP routing for mobile device applications. For example, the GSLB server 124 may use various techniques such as server load balancing, health checking, geo-location detection, consideration of mobile provider information and location (e.g. AT&T, San Francisco) to determine the optimal entry POP 110a. In some embodiments, the GSLB server 124 may be implemented as a representational state transfer (REST) web application programming interface (API) server.

The analytics server 126 may be configured to collect various metric information for connections using the mobile accelerator system 104, run a big data processing engine to analyze traffic metric data, and store the traffic metric data into the one or more control tower databases 128 for later lookup and mobile accelerator interactions (e.g., traffic view, per-country traffic information, performance comparison charts, etc.). In some embodiments, the mobile accelerator system 104 may include a collection of analytic servers 128 configured to perform extract, transform and load (ETL) (e.g., streaming data handling, processing engine).

The control tower system 120 may include one or more servers and one or more databases at a particular location. The control tower system 120 may be part of a POP 110 of the mobile accelerator system 104. In another example, the control tower system 120 may be a separate from the POPs 110 (e.g., a dedicated POP). In some embodiments, the mobile accelerator system 104 may include a plurality of control tower systems 120 to provide backup, redundancy, distributed service, and/or disaster recovery.

The mobile device 102 may connect with a POP 110 or the control tower system 120 of the mobile accelerator system 104 via connection 112. Connection 112 may include a wireless connection utilizing Wi-Fi and/or mobile broadband technologies (e.g., 2G, 3G, 4G, and/or long-term evolution (LTE), etc.). In some embodiments, connection 112 may additionally or alternatively include a wired connection, such as Ethernet, universal serial bus (USB), wired broadband, etc. The connection 112 may represent a "last mile" or final leg of the system 100 for content delivery from content server 108 to the mobile device 102.

In some embodiments, a mobile device 102 and/or entry POP 110a may form a dedicated channel to optimize the connection between the mobile device 102 and the entry POP 110a. For example, the mobile accelerator module 204 of the mobile device 102 may be configured to receive a POP list from the GSLB server 124 including a ranked listing of POPs 110 for use as the entry POP 110a, and the highest ranking POP 110 may be selected as the entry POP 110a.

The data transfers between the device POP 206 and the selected entry POP 110a may be optimized based on translation into a mobile accelerator protocol. The mobile accelerator protocol may optimize the data transfers using techniques such as compression, FEC (forward error correction), 0-rtt connection, TCP optimization (large initial window size, optimized congestion control, etc.), and/or HTTP optimization (caching, compression, front end optimization). The connection between the device POP 206 and the entry POP 110a may be further configured to facilitate data routing, such as through Layer 3 and/or Layer 4 switches. In some embodiments, the device POP 206 and/or mobile accelerator module 204 of the mobile device 102 may be configured to translate outgoing data (e.g., data transfers, messages to content servers, etc.) from a default protocol used by the mobile application, such as the Transmission Control Protocol (TCP), into the mobile accelerator protocol prior to sending the data to the entry POP 110a for accelerated data transfer. In some embodiments, the mobile accelerator protocol may also be used for data transfers between POPs 110.

The content server 108 and the network 106 may be connected with an exit POP 110b of the mobile accelerator system 104 via a connection 116. The content router module 304 of the entry POP 110a may be configured to select the exit POP 110b from the POPs 110 of the mobile accelerator system 104 based the quality of the connection 116 between the POP 110 and the content server 108. For example, connection quality may be determined based on synthetic latency between the exit POP 110b and content server 106 through the network 106, among other things. The connection 116 may represent a "first mile" or first leg of the system 100 for content delivery from content server 108 to the mobile device 102. The data in the mobile accelerator protocol may be translated to the default protocol (e.g., TCP) by a protocol translation module 302 of a POP 110 before the being provided to the connection 116.

In some embodiments, the connection 116 between the exit POP 110b and content servers 108 may be supported with various functionality such TCP optimization, connection pooling, and HTTP keep-alive.

The content server 108 may be an original host of content, or alternatively, may be a dedicated content delivery server or other redundant host. For example, the content server 108 may be one or multiple content delivery servers of a content delivery network (CDN). In some embodiments, such as when content is available from multiple content servers, the content server 108 may be determined as a nearest content server capable of providing the content to the mobile device 102 and/or a POP 110 (e.g., such as based on access time for a uniform resource locator (URL) reference to the desired content). The content server may be configured to facilitate mobile application functionality, such as by transferring data with the mobile application module 202 of a mobile device 102. In some embodiments, content server 108 may be a user device, such as a mobile device 102 configured to provide content delivery via the network 106.

The connections between POPs 110 (e.g., the entry POP 110a and the exit POP 110b) may be optimized based on the mobile accelerator protocol to support various functionality such as 0-rtt connection, transmission control protocol (TCP) optimization (e.g., for a long haul network), hypertext transfer protocol (HTTP) optimization (e.g., caching, front-end optimization), data compression (e.g., stream or packet level), encryption, connection pooling, and/or HTTP keep-alive. The connection between the POPs 110 may be further configured to facilitate data routing, such as through Layer 4 switches.

In addition or alternative to connections between the mobile device 102 and the content server 108 through the mobile accelerator system 104, system 100 may provide for a direct connection between the mobile device 102 and the content server 108 through network 106, bypassing the mobile accelerator system 104 when suitable. Here, the mobile application module 202 of the mobile device 102 does not use a device POP 206, and instead uses the default network proxy of the mobile application. Connection 114, like connection 112, may represent the last mile for system 100, and may include a wireless connection utilizing Wi-Fi and/or mobile broadband technologies and/or a wired connection.

Network 106 may include a public network such as the Internet. Network 106 may include one or more wired and/or wireless communication networks including, for example, a wired or wireless local area network (LAN), personal area network (PAN), metropolitan area network (MAN), wide area network (WAN), or the like, as well as any hardware, software and/or firmware for implementing the one or more networks (such as, e.g., network routers, switches, hubs, etc.). For example, network 106 may include a cellular telephone, mobile broadband, long term evolution (LTE), GSM/EDGE, UMTS/HSPA, IEEE 802.11, IEEE 802.16, IEEE 802.20, Wi-Fi, dial-up, and/or Wi-Max network. Furthermore, network 106 may include a public network (e.g., the Internet), a private network, and/or combinations thereof, and may utilize a variety of networking protocols now available or later developed including, but not limited to TCP/IP based networking protocols.

FIG. 4 shows a schematic block diagram of example circuitry 400, some or all of which may be included in a mobile device 102, control tower system 124 (e.g., accelerator portal server 122, GSLB server 124, analytics server 126, or control tower database 128) and/or a POP 110 of the mobile accelerator system 104. In accordance with some example embodiments, circuitry 400 may include various means for performing some or all of the functionality discussed herein, such as one or more processors 402, memories 404, communications modules 406, and/or input/output modules 208.

As referred to herein, "module" includes hardware, software and/or firmware configured to perform one or more particular functions. In this regard, the means of circuitry 400 as described herein may be embodied as, for example, circuitry, hardware elements (e.g., a suitably programmed processor, combinational logic circuit, integrated circuit, and/or the like), a computer program product comprising computer-readable program instructions stored on a non-transitory computer-readable medium (e.g., memory 404) that is executable by a suitably configured processing device (e.g., processor 402), or some combination thereof.

Processor 402 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 4 as a single processor, in some embodiments, processor 402 may comprise a plurality of processing components or means. The plurality of processing components may be embodied on a single computing device or may be distributed across a plurality of computing devices collectively configured to function as circuitry 400. The plurality of processing components may be in operative communication with each other and may be collectively configured to perform one or more functionalities of circuitry 400 as described herein. In an example embodiment, processor 402 may be configured to execute instructions stored in memory 404 or otherwise accessible to processor 402. These instructions, when executed by processor 402, may cause circuitry 400 to perform one or more of the functionalities described herein.

Whether configured by hardware, firmware/software methods, or by a combination thereof, processor 402 may comprise an entity capable of performing operations according to embodiments of the present invention while configured accordingly. Thus, for example, when processor 402 is embodied as an ASIC, FPGA or the like, processor 402 may comprise specifically configured hardware for conducting one or more operations described herein. As another example, when processor 402 may be embodied as an executor of instructions, such as may be stored in memory 404, the instructions may specifically configure processor 402 into a specific machine that performs one or more algorithms, methods or operations described herein. For example, processor 402 may be configured to execute operating system applications, firmware applications, media playback applications, media editing applications, among other things.

Memory 404 may comprise, for example, volatile memory, non-volatile memory, or some combination thereof. Although illustrated in FIG. 4 as a single memory, memory 404 may comprise a plurality of memory components. The plurality of memory components may be embodied on a single computing component or distributed across a plurality of computing components. In various embodiments, memory 404 may comprise, for example, a hard disk, random access memory, cache memory, flash memory, a compact disc read only memory (CD-ROM), solid state memory, digital versatile disc read only memory (DVD-ROM), an optical disc, circuitry configured to store information, integrated circuitry, chemical/biological memory, paper, or some combination thereof. Memory 404 may be configured to store information, data, applications, instructions, or the like for enabling circuitry 400 to carry out various functions in accordance with example embodiments discussed herein. For example, in at least some embodiments, memory 404 may be configured to buffer input data for processing by processor 402. Additionally or alternatively, in at least some embodiments, memory 404 may be configured to store program instructions for execution by processor 402 and/or data for processing by processor 402. Memory 404 may store information in the form of static and/or dynamic information. This stored information may be stored and/or used by circuitry 400 during the course of performing its functionalities.

Communications module 406 may be embodied as any component or means embodied in circuitry, hardware, a computer program product comprising computer readable program instructions stored on a computer readable medium (e.g., memory 404) and executed by a processing device (e.g., processor 402), or a combination thereof that is configured to receive and/or transmit data from/to another device, such as, for example, a second circuitry 400 or other computing device. In some embodiments, communications module 406 (like other components discussed herein) can be at least partially embodied as or otherwise controlled by processor 402. In this regard, communications module 406 may be in communication with processor 402, such as via a bus. Communications module 406 may include, for example, an antenna, a transmitter, a receiver, a transceiver, network interface card and/or supporting hardware and/or firmware/software for enabling communications. Communications module 406 may be configured to receive and/or transmit any data that may be stored by memory 404 using any protocol that may be used for communications. Communications module 406 may additionally and/or alternatively be in communication with the memory 404, input/output module 408 and/or any other component of circuitry 400, such as via a bus. Communications module 406 may be configured to use one or more communications protocols such as, for example, Wi-Fi (e.g., a 802.11 protocol, etc.), Bluetooth, radio frequency systems (e.g., 900 MHz, 1.4 GHz, and 5.6 GHz communication systems), infrared, GSM, GSM plus EDGE, CDMA, 2G, 3G, 4G, LTE, mobile broadband, and other cellular protocols, VOIP, or any other suitable protocol.

Input/output module 408 may be in communication with processor 402 to receive an indication of an input and/or to provide an audible, visual, mechanical, or other output. Some example inputs discussed herein may include user inputs for interacting with remote content servers, as well as for user inputs that configure parameters or settings of mobile acceleration. In that sense, input/output module 408 may include means for performing analog-to-digital and/or digital-to-analog data conversions. Input/output module 408 may include support, for example, for a display, touch sensor, touch screen, keyboard, button, click wheel, mouse, joystick, an image capturing device, microphone, speaker, biometric scanner, camera, motion sensor, and/or other input/output mechanisms. In embodiments where circuitry 400 may be implemented as a POP, server or database, aspects of input/output module 408 may be reduced as compared to embodiments where circuitry 400 may be implemented as an end-user machine or other type of device designed for complex user interactions (e.g., mobile device 102). In some embodiments (like other components discussed herein), input/output module 408 may even be eliminated from circuitry 400. Alternatively, such as in embodiments wherein circuitry 400 is embodied as a server or database, at least some aspects of input/output module 408 may be embodied on a mobile device used by a user that is in communication with circuitry 400. Input/output module 408 may be in communication with memory 404, communications module 406, and/or any other component(s), such as via a bus. Although more than one input/output module and/or other component can be included in circuitry 400, only one is shown in FIG. 4 to avoid overcomplicating the disclosure (e.g., like the other components discussed herein).

In some embodiments, non-transitory computer readable storage media can be configured to store firmware, one or more application programs, and/or other software, which include instructions and other computer-readable program code portions that can be executed to control processors of the components of system 400 to implement various operations discussed herein. As such, a series of computer-readable program code portions may be embodied in one or more computer program products and can be used, with a device, server, database, and/or other programmable apparatus, to produce the machine-implemented processes discussed herein.

Any such computer program instructions and/or other type of code may be loaded onto a computer, processor or other programmable apparatus's circuitry to produce a machine, such that the computer, processor other programmable circuitry that executes the code may be the means for implementing various functions, including those described herein. In some embodiments, one or more external systems (such as a remote cloud computing and/or data storage system) may also be leveraged to provide at least some of the functionality discussed herein.

As described above and as will be appreciated based on this disclosure, various embodiments may be implemented as methods, mediums, devices, servers, databases, systems, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD/DVD-ROMs, flash memory, optical storage devices, quantum storage devices, chemical storage devices, biological storage devices, magnetic storage devices, etc.

Embodiments have been described above with reference to block diagrams of components, such as functional modules, system components and circuitry. Below is a discussion of an example process flowcharts describing functionality that may be implemented by one or more components discussed above. Each block of the block diagrams and process flowcharts, and combinations of blocks diagrams and process flowcharts, respectively, can be implemented by various means including computer program instructions. These computer program instructions may be loaded onto a general purpose computer, special purpose computer, or other programmable data processing apparatus, such as processor 402, to produce a machine, such that the computer program product includes the instructions which execute on the computer or other programmable data processing apparatus to create a means for implementing the functions specified in the flowchart block or block diagrams.

These computer program instructions may also be stored in a computer-readable storage device (e.g., memory 404) that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the block diagrams and process flowcharts, and combinations of blocks in the block diagrams and process flowcharts, can be implemented by special purpose hardware-based computer systems that perform the specified functions or steps, or combinations of special purpose hardware and computer instructions.

Mobile Device Application Acceleration

FIGS. 5-7 show flowcharts of example methods 300-500 related to mobile acceleration, respectively, in accordance with some embodiments. Most of the steps of methods 500-600 are generally discussed herein as being performed by components of system 100 discussed above. However, other suitable devices, apparatus, systems and/or circuitry may be used. FIGS. 8 and 9 show example interfaces or displays that may be presented on the mobile device 102 to facilitate user interactions and configurations of the mobile acceleration.

FIG. 5 shows a flow chart of an example of a method 500 for initializing mobile application data transfer acceleration on a mobile device, performed in accordance with some embodiments. Method 500 may be performed to integrate a mobile application configured to execute on a mobile device 102 with the mobile accelerator system 104 to use the system 104 for mobile data transfer acceleration when suitable. Method 500 may begin at 502 and proceed to 504, where a software development kit (SDK) may be initialized for the mobile application, such as when the mobile application is launched. For example, an accelerator portal server 122 (e.g., of the mobile accelerator system 104) may be configured to provide the SDK to mobile application developer machines. The accelerator portal server 122 may be configured to host a web site, application, or the like, where application developers can sign up, sign in and download the SDK. The SDK may include an initialization function that may be integrated with the mobile application. The application developer may write the mobile application using the SDK such that the initialization function is called when the mobile application is launched on the mobile device 102. The integrated mobile application may then be provided to the mobile device 102 for installation and/or execution, such as by the mobile application module 202 of the mobile device 102. After installation of the mobile application, the SDK may be initialized when the mobile application is launched on the mobile device 102. Based on the developer registration and mobile application integration, the mobile application may be determined as authorized for mobile data transfer acceleration by the mobile accelerator system 104. As such, the mobile application may be configured to use the mobile accelerator system 104 for data transfers.

At 506, the accelerator portal server 122 may be configured to receive a request to register the mobile application (e.g., the user's copy) for mobile data transfer acceleration. The request may be generated by the mobile device 102 and sent to the accelerator portal server 122 as part of or in response to the initialization of the SDK integrated mobile application. For example, the user may sign up and create an account using a website or other portal provided the accelerator portal server 122. Subsequent to the registration, the user may download, install an SDK of the mobile accelerator module 204 into the mobile application module 202, thereby adding the mobile accelerator module 204 to the mobile device 102. The accelerator portal server 122 may provide for selective deployment of mobile acceleration on a per-application basis, such as by providing a user interfacing including an application list. The user may select the mobile application from the application list to generate the request to register the mobile application, and the mobile device 102 may be configured to send the request to the accelerator portal server 122.

At 508, in response to receiving the request to register the mobile application, the accelerator portal server 122 may be configured to determine a client key for the mobile application. The client key may be a per-application unique string or code generated by the accelerator portal server 122, or some other component of the mobile accelerator system 104, and associated with the mobile application. In some embodiments, each mobile application which is registered, authorized, or otherwise configured to use the mobile accelerator system 104 may have a unique client key. In another example, each instance of the mobile application operating on a mobile device may have a unique client key.

At 10, the accelerator portal server 122 may be configured to provide the client key for the mobile application to mobile device 102. The client key may be stored at the mobile device 102, and subsequently returned to accelerator portal server 122 by the mobile accelerator module 204 for authentication and tracking (e.g., traffic for billing purposes).

At 512, the accelerator portal server 122 may be configured to generate and store user configuration data for mobile data transfer acceleration. Furthermore, the accelerator portal server 122 may be configured to receive and store management configuration data for the mobile data transfer acceleration such as from application developer or management devices.

The mobile accelerator module 204 may be configured to generate the user configuration data, such as based on user inputs via one or more user interfaces presented by a mobile accelerator application. The user configuration data may include data defining application level configuration, domain name level configuration, and/or country level (or other location or regional level) configuration. The user configuration data may be provided to the accelerator portal server 122, where it is stored for subsequent use and updates.

When application level configuration is used, the mobile data transfer for each mobile application executing on the mobile device 102 may be individually controlled (e.g., toggled on/off) by user on the mobile device 102. The mobile accelerator module 204 of the mobile device 102 may be configured to provide the mobile accelerator application including a user interface. FIG. 8 shows an example of an application level configuration interface 800, in accordance with some embodiments. To facilitate application level configuration, the interface 800 may include an application setting list including a listing of applications that have been integrated with the mobile accelerator system (e.g., based on using the SDK). For example, mobile application 802 may be listed within the application setting list, and the user may selectively enable or disable mobile data transfer acceleration for the mobile application 802 using on/off button 804. Mobile application 802 may be further associated with displayed metadata 806, such as application version, SDK version, initialization date, and country level configuration settings. The user configuration data for application level configuration may be based on toggling the on/off button for mobile applications within the interface 800, which may be provided to the accelerator portal server 122.

When domain name level configuration is used, the mobile data transfer for mobile applications executing on the mobile device 102 may be controlled based on user configuration data defining content router domain name constraints. For example, each mobile device 102 may be associated with a whitelist or blacklist. The whitelist or blacklist may include a listing of one or more domain names to facilitate the domain name level configuration for mobile data transfer acceleration. The user interface provided by the mobile accelerator module 204 may be configured to facilitate creation and management of a whitelist or blacklist, such as by allowing for selection of whitelist or blacklist creation, and for the updates to the created whitelist or blacklist with domain names.

The whitelist, when used, allows mobile data transfer acceleration to fully qualified domain names (FQDNs) listed on the whitelist, but restricts mobile data transfer acceleration for other unlisted FQDNs. The blacklist, when used, restricts mobile data transfer accelerations for FDQNs listed on the blacklist, but permits data transfers for the mobile application to/from other FDQNs not on the blacklist. The whitelist or blacklist generated by the user interface of the mobile device 102 may be stored by the accelerator portal server 122, such as within the control tower database 128, and accessed to determine selective deployment settings of mobile data transfer acceleration for data transfers to or from content servers 108 as identified by FDQN.

In some embodiments, a single set of domain name level configurations (whitelist or blacklist) may be applied across multiple (e.g., all) mobile applications. In another example, each mobile application or groups of mobile applications may have different domain name level configurations.

When country level configuration is used, the mobile data transfer for each mobile application executing on the mobile device 102 may be controlled based on mobile device location. FIG. 9 shows an example of a country level configuration interface 900, in accordance with some embodiments. The interface 900 may include a map display 902 and a list display 904, each of which may allow the user to selectively enable or disable data transfers using the mobile accelerator system based on selecting on/off configurations for each country (or groups of countries). The country on/off configurations may be compared with the current location of the mobile device 102.

In some embodiments, a single country level configuration may be applied across multiple (e.g., all) mobile applications. In another example, each mobile application or groups of mobile applications may have different country level configurations. As shown in FIG. 8 within the interface 800, each mobile application may include different country level configuration settings, such as at 808 for the mobile application 802. In some embodiments, the configuration level settings displayed at 808 may provide a link or reference to the country level configuration interface 900 for the particular mobile application. The interface 900 may further include application name display 906 to provide user context.

The management configuration data may define parameters of mobile data transfer acceleration for the mobile application as specified by the developer, host, or owner of the mobile application. In some embodiments, management configuration data may define partial deployment configuration. When partial deployment configuration is used, the mobile application developer may be allowed to define groups of mobile devices that are activated for mobile data transfer acceleration. For example, a first group of mobile devices may be activated and a second group may be deactivated, such as based on a rule such as a percentage of devices, a threshold number of devices, or any other suitable technique for determining group membership for accelerated devices. Partial deployment may be set at the application level and/or country level. FIG. 10 shows an example of a country level configuration interface 1000 with deployment control, in accordance with some embodiments. Interface 1000 may be provided to a developer or administrator machine to provide user inputs to generate the management configuration data. Interface 1000 may include a map display 1002 and a list display 1004, each of which may allow the user to selectively enable or disable data transfers using the mobile accelerator system based on selecting on/off configurations for each country (or groups of countries). For each country, the list display 1004 may include on/off controls (e.g., controls 1006 and 1008) that allow the user to selectively enable or disable data transfers using the mobile accelerator system for each country. For each country that has enabled data transfer, the list display 1004 may further include a deployment control 1010. The deployment control 1010 may provide for definition of device group memberships based on the percentage of devices activated for mobile data transfer acceleration, such as from a 0% (accelerate none or the minimum number of devices) to 100% range (accelerate all or the maximum number of devices). For example, if the mobile application is installed on 1,000 devices in country X, and the deployment control 1010 is set to 30%, then 300 devices of the 1,000 devices will receive an initialization response to accelerate data transfers. The group membership for the 300 activated devices may be selected randomly, or may be selected using other techniques to optimize traffic within the mobile accelerator system, test the mobile accelerator system (e.g., A/B test), etc. Once initialized as 'accelerated', the subset of devices may keep using the accelerated protocol until the connection is ended (e.g., application stops). In some embodiments, a predefined percentage of number of devices are not accelerated for data transfer/traffic comparisons, such as 0.1% (e.g., even when the deployment control 1010 is set to 100%).

The country level configuration interface 1000 may further include an application level deployment control button 1012, which may allow the user to control group membership for mobile data transfer acceleration for the mobile application at the application level. FIG. 11 shows an example of an application level deployment control interface 1100, in accordance with some embodiments, which may be provided (e.g., as an overlay to the interface 1000) in response to the user selecting the application level deployment control button 1012. The application level deployment control interface 1100 may include on/off control 1102 for the user to selectively enable or disable data transfers using the mobile accelerator system for the mobile application, and deployment control 1104 to provide for user definition of device activation group membership for the mobile application (e.g., from 0 to 100% of devices activated). The interface 1100 may be used to provide global partial deployment settings across multiple (e.g., all) countries, and may override or replace individual country level configurations when used.

At 514, the accelerator portal server 122 may be configured to receive a request to initialize mobile data transfer acceleration for the mobile application from the mobile device 102. For example, when the integrated mobile application executed by the mobile application module 202 is launched, the mobile application module 202 may be configured to call the initialization function with the stored client key for the mobile application. As such, the mobile application module 202 may generate the request to initialize the mobile acceleration for the mobile application and send the client key to the accelerator portal server 122.

At 516, in response to receiving the request to initialize mobile data transfer acceleration for the mobile application, the accelerator portal server 122 may be configured to validate the client key. For example, the accelerator portal server 122 may be configured to match the received client key with a stored client key within the control tower database 128. Furthermore, the accelerator portal server 122 may be configured to confirm that the client key is remains valid at request time (e.g., has not expired, been deactivated, hit a usage cap, etc.)

In some embodiments, the accelerator portal server 122 may be further configured to update or verify the configuration of the mobile device 102, such as by updating the package name, app version and/or SDK version if changed.

As such, the performance and functionality of the mobile device 102 is synchronized with any updates to the mobile accelerator system 104.

At 518, in response to receiving the request to initialize mobile data transfer acceleration for the mobile application and/or validating the client key, the accelerator portal server 122 may be further configured to determine user configuration data associated with or related to the mobile application. For example, the user configuration data may define application level configuration (e.g., whether data transfer for the mobile application is enabled or disabled by the user), domain name level configuration (e.g., whitelist or blacklist), and/or partial deployment configuration as discussed above at 412, and some or all of the user configuration data may be retrieved at 518.

At 520, in response to receiving the request to initialize mobile data transfer acceleration for the mobile application and/or validating the client key, the accelerator portal server 122 may be further configured to determine an entry POP list. The entry POP list may define an ordered ranking of one or more POPs 110 of the mobile accelerator system 104 for suitability as an entry POP for the mobile device 102. In some embodiments, the accelerator portal server 122 may be configured to query the GSLB server 124, which may be configured to generate the entry POP list, and return the entry POP list (and related data) to the accelerator portal server 122.

The POPs 110 may be ranked based on "entry POP scores," which may be a measure of data transfer speeds between the mobile device 102 and the POPs 110. In some embodiments, the entry POP scores may be determined based on one or more of mobile device IP address, network provider type (e.g., wifi or 3G/LTE), POP server load balancing, POP server health checking, mobile device geolocation, and/or mobile provider information and location (e.g. AT&T, San Francisco) to determine the ranking of entry POPs. The GSLB server 124 may be configured return to the accelerator portal server 122 the list of available entry POPs, and for each entry POP, the port and protocol to be used (e.g., the mobile accelerator protocol, or a default application protocol). For example, an entry POP and protocol may be identified based on a text string including an IP address of the entry POP and the protocol such as 1.2.3.4:8891/np2 (e.g., mobile accelerator protocol) or 1.2.3.5:8891/tcp (e.g., TCP protocol). Additional details regarding optimal routing of entry POPs and other components of a mobile accelerator system, applicable in some embodiments, are discussed in U.S. patent application Ser. No. 14/644,116, titled "Mobile Accelerator," filed Mar. 10, 2015, which is incorporated by reference herein in its entirety.

In some embodiments, determination of the entry POP list is performed only in response to determining that the mobile device 102 has selectively enabled mobile data transfer acceleration for the mobile application.

At 522, the accelerator portal server 122 may be configured to generate an initialization response to the request to initialize mobile data transfer acceleration for the mobile application. The initialization response may include the configuration settings for the mobile application (e.g., as defined by the user and/or the application host) and the entry POP list to facilitate initialization of a device POP. For example, the initialization response may include one or more text strings indicating whether the device POP for the mobile application is selectively enabled or created by the user (e.g., IsProxy=On or Off), whether mobile data transfer acceleration is selectively enabled by the application host/developer (PassThrough=On or Off), the blacklist or whitelist (e.g., blacklist={*.yahoo.com, www.neumob.com}; or whitelist={*.neumob.net, www.google.com, www.yahoo.com}), and the entry POP list with associated protocols/ports (e.g., proxylist={1.2.3.4:8891/np2, 1.2.3.5:8891/tcp}).

In some embodiments, the initialization response may further include an indication regarding partial deployment configuration. For example, the initialization response may include a "PassThrough" parameter, which may be set On or Off based on the management configuration data. The accelerator portal server 122 may be configured to return in the initialization response return one of the three states based on the deployment configuration above: (i) IsProxy=On, PassThrough=Off: mobile device POP and mobile data transfer optimization is activated; (ii) IsProxy=On, PassThrough=On: initialize device POP, no dedicated channel for mobile data transfer optimization will be created, but device POP is used for collecting traffic meta data for analysis; and (iii) IsProxy=Off: do nothing, such as by not initializing a device POP and data transfer acceleration. The accelerator portal server 122 may be configured to determine the initialization response based on the management configuration data. For example, the accelerator portal server 122 may be configured to determine group membership for the mobile device as being activated or not so as to satisfy the specified partial deployment. If country A is configured to 80% partial deployment, for example, then a first group of 80% of user configuration data requests result initialization responses will include (i) IsProxy=On, PassThrough=Off (fully accelerate), and a second group of 20% of requests will include (ii) IsProxy=On, PassThrough=On (data collection only). If country A is "turned off" (e.g., Afghanistan in FIG. 10), the initialization response may return (iii) IsProxy=Off, resulting in no creation or use of the device POP.

At 524, the accelerator portal server 122 may be configured to send the initialization response to the mobile device 102. The mobile device 102 may be configured to, based on the initialization response, selectively activate or deactivate mobile data transfer acceleration functionality for the mobile application. As such, the accelerator portal server 122 may be configured to provide a web service for the initialization of mobile data transfer acceleration functionality on mobile devices on a per-application basis. Method 500 may then proceed to 526 and end.

FIG. 6 shows a flow chart of an example of a method 600 for creating a dedicated channel for mobile application data transfer acceleration, performed in accordance with some embodiments. For each application executing on the mobile device 106, a dedicated channel for data transfer using the mobile accelerator system 104 may be selectively enabled or disabled. Method 600 may be performed after method 500, when a mobile application has been initialized for data transfer acceleration by the mobile accelerator system 104.

Method 600 may begin at 602 and proceed to 604, where the mobile accelerator module 204 of the mobile device 102 may be configured to receive the initialization response from the accelerator portal server 122. The discussion at 520 of method 500 may be applicable at 604.

At 606, the mobile accelerator module 204 may be configured to determine, based on the initialization response, whether to initialize mobile data transfer acceleration for the mobile application. For example, if mobile data transfer acceleration for the mobile application is selectively enabled (e.g., IsProxy=On, PassThrough=On or Off) when data transfer is otherwise authorized by the mobile accelerator system 104, the mobile accelerator module 204 may be configured to determine to initialize the mobile data transfer acceleration for the mobile application.

Some embodiments may support partial deployment or data transfer acceleration based on the initialization response. For example, the initialization response may further include the PassThrough parameter determined from the user configuration data, and which defines whether or not to use mobile data transfer acceleration based on group membership of the mobile devices that have installed the mobile application.

In response to determining to initialize mobile data transfer acceleration for the mobile application, method 600 may proceed to 608, where the mobile accelerator module 204 may be configured to create a device POP 206 on the mobile device 102 for the mobile application. For example, the initialization response may include IsProxy=On. The device POP 206 may take the form of a network proxy, and may serve as the network access point for data transfers of the mobile application executing on the mobile application module 202. In some embodiment, a single device POP 206 can be shared with multiple mobile application modules 202 and/or mobile accelerator modules 204 for reducing CPU, memory, and network usage.

At 610, the mobile accelerator module 204 may be configured to point a network proxy server address of the mobile application to the device POP 206. As such, data transfers for the mobile application between the mobile device 106 and one or more content servers 108 may be routed through the device POP 206. Furthermore, the data transfers may be routed through the POPs 110 of the mobile accelerator system 104, such as through the dedicated connection between the device POP 206 and the optimal entry POP 110*a*. In some embodiments, pointing the network proxy server address of the mobile application results in the device POP 206 functioning as the HTTP/HTTPS proxy for the mobile application. However, the device POP 206 may also be extended to support other network protocols used by mobile applications.

At 612, the mobile accelerator module 204 may be configured to create a dedicated channel between the device POP 206 and an entry POP 110*a*. For example, the entry POP 110*a* may be selected based on the entry POP list returned with the initialization response from the accelerator portal server 122 at 604. The order of the entry POP list may define a priority for the dedicated channel. In the event that the highest ranking POP 110 is not available to form the dedicated channel, the mobile accelerator module 204 may be configured to attempt creating the dedicated channel with the next highest ranking POP 110, and so forth until a dedicated channel between the device POP 206 and an entry POP 110*a* has been created.

In some embodiments, the dedicated channel may multiplex multiple TCP connections (e.g., associated with different mobile applications) into a single channel that utilizes the mobile accelerator protocol. The mobile accelerator protocol may provide for one or more data transfer acceleration techniques such as compression, FEC (forward error correction), O-rtt connection, TCP optimization (large initial window size, optimized congestion control etc), and/or HTTP optimization (caching, compression, front end optimization).

When the dedicated channel is created for the mobile application, the device POP 206 of the mobile device 102 is connected with an entry POP 110*a* of the mobile accelerator system 104. As such, the mobile application executing on the merchant device 102 is connected with the mobile accelerator system 104, and data transfers for the mobile application with the content server 108 may traverse through the mobile accelerator system 104 when suitable.

In general, the mobile device 102 may be configured to execute (e.g., in parallel) multiple mobile applications. Each mobile application may communicate with different content servers 108 to perform its functionality. The mobile accelerator module 204 may be configured to create device POPs 206 for each mobile application to receive data transfer acceleration, and form a dedicated channel between each device POP 206 and an optimal entry POP 110*a*.

Returning to 606, in response to determining to not initialize mobile data transfer acceleration for the mobile application (e.g., IsProxy=On, PassThrough=On), method 600 may proceed to 614, where the mobile accelerator module 204 may be configured to create a device POP 206 on the mobile device 102 for the mobile application. At 616, the mobile accelerator module 204 may be configured to point a network proxy server address of the mobile application to the device POP 206. The discussion at 608 and 610 may be applicable at 614 and 616. However, the dedicated channel between the device POP 206 and the entry POP 110*a* is not created or used to route data transfers. The data transfers may be routed through the device POP 206 to monitor the data transfers for traffic metric data collection and analysis even when data acceleration for the mobile application is not initialized. Steps 614 and 616 may be performed when data transfer is not initialized but partial deployment (e.g., PassThrough=On) is enabled.

Alternatively, in some embodiments where data acceleration for the mobile application is not initialized and when partial deployment is disabled (e.g., IsProxy=Off), the mobile accelerator module 204 may be configured to forego creating a device POP and dedicated channel for the mobile application. As discussed above, the management configuration data may define a partial deployment configuration for the mobile application that enables or disables use of the mobile data transfer acceleration based on group membership, such as may be defined based on a percentage, number, etc. of the mobile devices 102 that have installed the mobile application. When data transfer acceleration is disabled and partial deployment is disabled, although data acceleration for this particular mobile application is not initialized, other device POPs 206 and dedicated connections associated with other mobile applications may exist. Method 600 may then proceed to 618 and end.

FIG. 7 shows a flow chart of an example of a method 700 for mobile application data transfer acceleration, performed in accordance with some embodiments. Method 700 may be performed to handle data routing for data transfer requests (and responses) generated by mobile applications to content servers 108. Method 700 may be performed after method 600, when a dedicated connection between a device POP 206 and an entry POP 110 of the mobile accelerator system 104 has been created for data transfers of a mobile application.

Method 700 may begin at 702 and proceed to 704, where the mobile application module 202 of the mobile device 106 may be configured to generate a data transfer request for a content server 108. The data transfer request may be generated by the mobile application module 202 in the course of executing the mobile application. For example, the mobile application may request content from the content server 108 to facilitate functionality of the mobile application, such as video or music streaming, social networking, search, ecommerce, etc.

At 706, the mobile application module 202 may be configured to send the data transfer request to the device POP 206. As discussed above, the device POP 206 may be set as the network proxy server address of the mobile application, and thus data transfer requests by the mobile application may be forwarded to the device POP 206. The transfer request may include an IP address or domain name (or a "FQDN" parameter) of the content server 108 to identify the content server 108.

At 708, the device POP 206 may be configured to determine whether the data transfer request is authorized based on configuration data. The configuration data may include user configuration data defining application level configuration, domain level configuration, and/or country level configuration. The configuration data may further include management configuration data defining partial deployment configuration (e.g., based on group membership). As discussed above in method 500, the application level configuration may be based on user inputs that toggle mobile acceleration on/off on a per-app basis. Some or all of the user configuration data may be checked each time a data transfer request is initiated to provide real-time user configuration. The whitelist or blacklist may be predefined by the user to provide domain name level configuration for mobile data transfer acceleration. Furthermore, the device POP 206 may be configured to receive the whitelist or blacklist from the accelerator portal server 122 to facilitate the control of data transfer routing.

The device POP 206 may be configured to compare the IP address or domain name of the content server 108 with the listing of FQDNs of the whitelist or blacklist. The whitelist or blacklist can be checked to see if the data transfer request should be accelerated. Only one whitelist or blacklist can be configured (not both). When the whitelist is set (Acceleration=True) and the IP or domain name (FQDN) matches a record in the whitelist, the data transfer request may be accelerated. For example, when FQDN=www.yahoo.com, and whitelist={*.yahoo.com, www.google.com}), the IP address or domain name may be determined to match a record in the whitelist because www.yahoo.com matches*.yahoo.com, considering wildcard or regular expression string match. When the blacklist is set (Acceleration=True) and FQDN matches one of record in the blacklist, this data transfer request is not accelerated. Otherwise, the data transfer request is accelerated. In some embodiments, at least a portion of the whitelist or blacklist may be programmatically generated based on analysis of protocol traffic associated with content servers, as discussed in U.S. patent application Ser. No. 14/863,339, incorporated by reference above.

The country level configuration may provide for selective mobile data transfer acceleration depending on the current location of the mobile device 102. For example, the country defined by the current location of the mobile device 102 may be compared with the data transfer on/off setting for the country to determine whether to the data transfer request is authorized based on user configuration data. The current location or country location of the mobile device may be determined based on any suitable technique, such as IP address, global positioning system (GPS) coordinates, cell-tower triangulation, etc.

In response to determining that the data transfer request from the content server 108 is authorized based on user configuration, method 700 may proceed to 710, where the device POP 206 may be configured to translate the data transfer request (or other data to be sent) into a mobile accelerator protocol. For example, the TCP data packets of the message generated by the mobile application may be translated into mobile acceleration data packets which employ various channel optimizations techniques as discussed herein, such as TCP acceleration, data compression, data encryption, HTTP optimization, etc.

In some embodiments, the device POP 206 may be configured to determine whether the data of the data transfer request is in a protocol that can be optimized or translated into the mobile accelerator protocol, and may send the data transfer request directly to the content server when the protocol cannot be optimized or translated. Some or all of the traffic analysis and routing functionality of the NProxy module 306 may be performed by the mobile device 102.

At 712, the device POP 206 may be configured to send the data transfer request to the entry POP 110a using the dedicated channel. The device POP 206 may be further configured to send the FDQN and/or IP/domain of the content server 208 to the entry POP 110a.

At 714, the content router module 304 of the entry POP 110a may be configured to determine a dynamic path through one or more POPs 110 of the mobile accelerator system 104. For example, the dynamic path may utilize another POP 110 of the mobile accelerator network as an exit POP 110b. Data transfers of the mobile application may thus be routed through the device POP 204, through the entry POP 110a, through an exit POP 110b, and then to the content server 108 via the network 106 (e.g., the Internet). Alternatively, the dynamic path may use the entry POP 110a as the exit POP 110b. Here, data transfers of the mobile application may be routed to through device POP 204, through the entry POP 110a, and through the content server 108 via the network 106.

The dynamic path may be determined based on scoring and/or ranking data transfer speeds (e.g., based on synthetic latencies) between the components along various dynamic path options. Additional details regarding optimal dynamic path routing through a mobile accelerator system, applicable in some embodiments, are discussed in U.S. patent application Ser. No. 14/644,116, which is incorporated by reference above.

The user configuration data may be saved at the mobile accelerator system 104 (e.g., within control tower database 128), or within the mobile device 102, and inherited across versions and updates of the mobile accelerator module (e.g., SDK) or mobile application. Advantageously, the user does not need to revisit the configuration settings every time they update their applications with a new version.

At 716, the content router module 304 may be configured to route data transfers between the mobile device 102 and the content server 108 through the dynamic path. For example, subsequent data transfer requests, data transfer responses from the content server 108, or any other data transmissions between the mobile device 102 and the content server 108, may be routed through the dynamic path. Furthermore, protocol translations may be performed such that the data used the mobile accelerator protocol for portions of the dynamic path. The dedicated connection between the device POP 206 and the entry POP 110a and/or the POP-to-POP connection, may utilize the mobile accelerator protocol while providing a translation layer to interface with the native protocols of mobile applications and content servers 108.

Furthermore, translation from the mobile accelerator protocol to the native protocol may be performed at various stages. In some embodiments, data transfers through the POPs 110 of the mobile accelerator system 104, such as from an entry POP 110a to an exit POP 110b, may use the mobile accelerator protocol. The protocol translation module 302 of the exit POP 110b may provide a translation service that converts data from the mobile accelerator protocol to the conventional (e.g., TCP) protocol for outgoing traffic, as expected by or compatible with the network 106 and the content server 108.

In some embodiments, data transfers through the POPs 110 of the mobile accelerator system 104, such as from an entry POP 110a to an exit POP 110b, do not use the mobile accelerator protocol. The protocol translation module 302 of the entry POP 110a may provide translation services that convert data from the mobile accelerator protocol to the TCP protocol, before transmitting the data to an exit POP 110b. Advantageously, translation to the mobile accelerator protocol for transmissions through one or more of mobile accelerator system 104 facilitates improved data transfer speeds, among other things such as security via encryption, data size via compression, etc.

At 716, the analytics server 126 of the control tower system 120 may be configured to generate traffic metric data based on monitoring the data transfers for subsequent entry POP and/or dynamic path determination. For example, the device POP 206 may be configured to capture traffic data associated with the data transfers such as (a) whether the data transfer request is accelerated or not, (b) protocol used (e.g., mobile accelerator protocol or TCP), (c) URL for the request, (b) domain name service (DNS) time, (e) connection time, (f) SSL handshake time (for TLS connection), (g) time to first byte, (h) time to content download), and (i) other performance metrics. In some embodiments, the device POP 206 may be configured to queue the traffic data for each data transfer request, and periodically send (e.g. every 10 seconds if there is queued traffic data) the traffic data to the analytics server 126. The may perform further analytics using the traffic data to generate the traffic metric data, such as performance comparison, usage tracking, error detection etc. The traffic metric data may be used to subsequently determine entry POP and exit POP routing. Furthermore, the traffic metric data may be used to provide analytics to the mobile accelerator application, such as traffic view, per-country traffic information, performance comparison charts, etc.

Returning to 708, in response to determining that the data transfer request from the content server 108 is authorized based on user configuration, method 700 may proceed to 718, where the device POP 206 may be configured to route data transfers between the mobile device 102 and the content server 108 without traversing a POP of the mobile accelerator system and without using mobile accelerator protocol translations. For example, the data transfers may be routed via the direct connection 116 between the mobile device 102 and the content server 108 through network 106. Method 700 may then proceed to 720 and end.

CONCLUSION

Many modifications and other embodiments will come to mind to one skilled in the art to which these embodiments pertain having the benefit of the teachings presented in the foregoing descriptions and the associated drawings. For example, while techniques for mobile device acceleration are discussed herein as being performed over the Internet, they may also be applicable to data delivery acceleration on other wide area networks and/or other (e.g., stationary, wired communication) devices. Therefore, it is to be understood that embodiments and implementations are not to be limited to the specific examples disclosed and that modifications and other embodiments are intended to be included within the scope of the appended claims.

That which is claimed:

1. A mobile accelerator system, comprising:
a control tower system, including:
an accelerator portal server configured to:
associate a client key with a mobile application authorized for mobile data transfer acceleration via a plurality of POPs;
provide the client key to a mobile device configured to execute the mobile application;
subsequent to the client key being provided to the mobile device, receive a request to initialize the mobile data transfer acceleration for the mobile application from the mobile device, wherein the request is to include the client key;
in response to receipt of the request to initialize mobile data acceleration for the mobile application, validate the client key;
in response to validation of the client key:
determine an entry POP from the plurality of POPs of the mobile accelerator system;
generate an initialization response including the entry POP and user configuration data for the mobile application; and
provide the initialization response to the mobile device to facilitate creation of a dedicated connection between the mobile device and a content server via the entry POP for the mobile data transfer acceleration by:
initiating the creation of a device POP on the mobile device when authorized by the user configuration data, and
causing a network proxy server address of the mobile application to point to the device POP, the entry POP configured to receive data transfers from the mobile application via the device POP.

2. The system of claim 1, wherein:
the control tower system further includes a global server load balancing (GSLB) server configured to determine an entry POP list based on a ranking of the plurality of POPs for connection speed with the mobile device; and
the initialization response is to include the entry POP list.

3. The system of claim 2, wherein the GSLB server configured to determine the ranking of the plurality of POPs includes the GSLB server being configured to determine the ranking based on one or more of:
POP server load balance;
POP server health check;
mobile device geo-location; or
mobile provider information or location.

4. The system of claim 1, wherein the control tower system further includes an analytic server configured to:
receive traffic data from the mobile device captured based on monitoring the data transfers via the dedicated connection between the mobile device and the entry POP for the mobile application; and
generate traffic metric data based on the traffic data.

5. The system of claim 1, wherein:
the accelerator portal server is further configured to, in response to validation of the client key, determine the user configuration data for the mobile application provided by the mobile device; and
the initialization response is to be provided to the mobile device to facilitate creation of the dedicated connection when authorized by the user configuration data.

6. The system of claim 5, wherein the user configuration data is to define an application level configuration for the mobile application that enables or disables the mobile data transfer acceleration for one or more mobile applications executing on the mobile device on a per-app basis.

7. The system of claim 5, wherein the user configuration data is to define a domain name level configuration for the mobile application that enables or disables the mobile data transfer acceleration based on content server address.

8. The system of claim 5, wherein the user configuration data is to define a country level configuration for the mobile application that enables or disables the mobile data transfer acceleration based on a current location of the mobile device.

9. The system of claim 1, wherein:
the accelerator portal server is further configured to, in response to validation of the client key, determine management configuration data for the mobile application;
the initialization response is to include the management configuration data; and
the management configuration data is to define a partial deployment configuration for the mobile application that enables or disables use of the mobile data transfer acceleration based on group membership of the mobile device.

10. The system of claim 5, wherein:
when authorized by the user configuration data, the entry POP is further configured to:
form the dedicated connection with the device POP of the mobile device;
determine a dynamic path traversing one or more of the plurality of POPs; and
route the data transfers between the mobile device and the content server through the dedicated connection and the dynamic path; and
the device POP is a network proxy server created by the mobile device for the mobile application when authorized by the user configuration data.

11. The system of claim 10, wherein:
the dedicated connection and the dynamic path are configured to utilize a mobile accelerator protocol that facilitates the mobile data transfer acceleration;
the plurality of POPs further includes an exit POP;
the dynamic path includes the exit POP; and
the exit POP includes a protocol translation module configured to convert the data transfers using the mobile accelerator protocol to a default protocol of the mobile application.

12. The system of claim 10, wherein:
the dedicated connection is configured to utilize a mobile accelerator protocol that facilitates the mobile data transfer acceleration;
the dynamic path is configured to utilize a default protocol of the mobile application; and
the entry POP includes a protocol translation module configured to convert the data transfers using the mobile accelerator protocol to the default protocol of the mobile application.

13. The system of claim 1, wherein the entry POP is configured to form multiple dedicated connections with multiple devices POPs of the mobile device, each device POP associated with a different mobile application executing on the mobile device.

14. A method for mobile data transfer acceleration of a mobile application, comprising:
associating, by one or more servers of a mobile accelerator system, a client key with a mobile application authorized for mobile data transfer acceleration via a plurality of POPs of the mobile accelerator system;
providing, by the one or more servers, the client key to a mobile device configured to execute the mobile application;
subsequent to providing the client key to the mobile device, and by the one or more servers, receiving a request to initialize the mobile data transfer acceleration for the mobile application from the mobile device, wherein the request includes the client key;
in response to receiving the request to initialize mobile data acceleration for the mobile application, and by the one or more servers, validating the client key; and
in response to validating the client key, and by the one or more servers:
determining an entry POP from the plurality of POPs of the mobile accelerator system;
generating an initialization response including the entry POP and user configuration data for the mobile application; and
providing the initialization response to the mobile device to facilitate creation of a dedicated connection between the mobile device and a content server via the entry POP for the mobile data transfer acceleration by:
determining that an initiation of the creation of a device POP on the mobile device is authorized by the user configuration data;
responsive to the determining, initiating the creation of the device POP on the mobile device, and
causing a network proxy server address of the mobile application to point to the device POP, the entry POP configured to receive data transfers from the mobile application via the device POP.

15. The method of claim 14, further comprising determining, by the one or more servers, an entry POP list based on a ranking of the plurality of POPs for connection speed with the mobile device, and wherein the initialization response includes the entry POP list.

16. The method of claim 15, wherein determining the ranking of the plurality of POPs includes determining the ranking based on one or more of:
POP server load balance;
POP server health check;
mobile device geo-location; or
mobile provider information or location.

17. The method of claim 14 further comprising, by the one or more servers:
receiving traffic data from the mobile device captured based on monitoring the data transfers via the dedicated connection between the mobile device and the entry POP for the mobile application; and
generating traffic metric data based on the traffic data.

18. The method of claim 14, wherein:
further in response to validating the client key, determining the user configuration data for the mobile application provided by the mobile device; and
the initialization response is provided to the mobile device to facilitate creation of the dedicated connection when authorized by the user configuration data.

19. The method of claim 18, wherein the user configuration data defines an application level configuration for the mobile application that enables or disables the mobile data transfer acceleration for one or more mobile applications executing on the mobile device on a per-app basis.

20. The method of claim 18, wherein the user configuration data defines a domain name level configuration for the mobile application that enables or disables the mobile data transfer acceleration based on content server address.

21. The method of claim 18, wherein the user configuration data defines a country level configuration for the mobile application that enables or disables the mobile data transfer acceleration based on a current location of the mobile device.

22. The method of claim 14, wherein:
further in response to validating the client key, determining management configuration data for the mobile application;
the initialization response includes the management configuration data; and
the management configuration data defines a partial deployment configuration for the mobile application that enables or disables use of the mobile data transfer acceleration based on group membership of the mobile device.

23. The method of claim 18, further comprising:
when authorized by the user configuration data, and by the entry POP:
forming the dedicated connection with the device POP of the mobile device;
determining a dynamic path traversing one or more of the plurality of POPs; and
routing the data transfers between mobile device and the content server through the dedicated connection and the dynamic path; and the device POP is a network proxy server created by the mobile device for the mobile application when authorized by the user configuration data.

24. The method of claim 23, further comprising:
wherein the dedicated connection and the dynamic path are configured to utilize a mobile accelerator protocol that facilitates the mobile data transfer acceleration;
wherein the plurality of POPs further includes an exit POP;
wherein the dynamic path includes the exit POP; and
converting, by the exit POP, the data transfers using the mobile accelerator protocol to a default protocol of the mobile application.

25. The method of claim 23, further comprising:
wherein the dedicated connection is configured to utilize a mobile accelerator protocol that facilitates the mobile data transfer acceleration;
wherein the dynamic path is configured to utilize a default protocol of the mobile application; and
converting, by the entry POP, the data transfers using the mobile accelerator protocol to the default protocol of the mobile application.

26. The method of claim 14 further comprising, by the entry POP, forming multiple dedicated connections with multiple devices POPs of the mobile device, each device POP associated with a different mobile application executing on the mobile device.

* * * * *